METHOD OF MEASURING ACCELERATED CORROSION RATE

Filed Jan. 16, 1969 7 Sheets-Sheet 1

INVENTOR
Robert G. Seyl

INVENTOR
Robert G. Seyl

INVENTOR
Robert G. Seyl

INVENTOR
Robert G. Seyl

INVENTOR
Robert G. Seyl

METHOD OF MEASURING ACCELERATED CORROSION RATE

Filed Jan. 16, 1969

INVENTOR
Robert G. Seyl

Sept. 26, 1972 R. G. SEYL 3,694,324

METHOD OF MEASURING ACCELERATED CORROSION RATE

Filed Jan. 16, 1969 7 Sheets-Sheet 7

INVENTOR
Robert G. Seyl

United States Patent Office 3,694,324
Patented Sept. 26, 1972

3,694,324
METHOD OF MEASURING ACCELERATED CORROSION RATE

Robert G. Seyl, 1123 Mulford St., Evanston, Ill. 60202

Filed Jan. 16, 1969, Ser. No. 791,653
Int. Cl. G01n 27/46
U.S. Cl. 204—1 T 8 Claims

ABSTRACT OF THE DISCLOSURE

A method for measuring accelerated corrosion rate. The method uses a first measurement of current according to the principle of proportionality of measured current to naturally occurring current and uses the application of a small increment of voltage applied to one or more electrodes as in U.S. Pats. 3,156,631; 3,069,332 and 3,250,689. After measurement of a first current in accordance with the known method, an increment of cathodic polarizing current is applied to the electrode or electrodes. This increment of cathodic polarizing current is varied over a range. The rate determining corrosion current is then determined by the relationship between the first measured current and the minimum current measured in said range.

This invention relates to methods of measuring the corrosion of electronic conductors by non-gaseous ionic conductors, and more specifically is directed to measurement of an accelerated form of corrosion.

THE MEASUREMENT OF CORROSION CURRENT

The method of this invention utilizes and expands upon concepts, electrode configurations, and method steps of my method for measuring a corrosion current indicative of the corrosion rate occurring at the free electrode potential of an electronic-ionic conductor interface, as disclosed in my U.S. Pats. Nos. 3,156,631, 3,069,332, and 3,250,689.

The method of these patents starts with the concept that initial measurable range of polarizing DC current passed through an electronic-ionic conductor interface and of polarization voltage thereby produced, tends to occur in relationship form produced by or resulting from the current-potential relationships of an electrochemical mechanism operating within the interfaces. Method steps are devised to measure initial range of polarizing DC current-potential relationship with a minimum of distortions attributed to the operations of electrochemical factors which can vary in effect with the passage of time. Current-potential relationships measured by this method, when graphed to linear voltage and current axes, are distinguished in form by comprising a plurality of linear relationships extending between transition points of line slope change that occur at 0.02 volt separations, with these lines frequently occurring in a consecutively related order of slope change during early progress of the corrosion in the absence of dissolved oxygen. The operations of resolving this resultant form of measured current-potential relationship into the component form of corrosion mechanism that produces it, are accomplished through the concepts that each transition point occurs at the free electrode potential of what is termed an Interface Electrode, and that the related order of line slope change between consecutive transition points results from the anodic and cathodic polarizabilities of the interface electrodes being related to each other through mathematical order. This mathematical order is expressed through additional concept detail, and points to regarding the corrosion mechanism as an Interface Electrode System of mathematically related current - potential proportionalities, which operates within the electronic-ionic conductor interface as an inherent property such that the corrosion current becomes measurable through a characteristic Direct Voltage basically defined as the sum of the anodic and cathodic polarization voltages produced by a value of polarizing DC current made equal to the corrosion current. This Direct Voltage occurs within the initial range of substantially linearity of measurable anodic and cathodic current-potential relationships, the direct proportionalities of which enable precision simplified method measurement of the corrosion current of the Interface Electrode System from a single measurement of a polarizing DC current passed through the corrosion interface and of resulting polarization voltage occurring within this range of substantial linearity that extends from zero to about 0.02 volt, with additional precision obtained by repeating the measurements with reversed direction of the DC current.

Corrosion current measurements made on a wide range of electronic-ionic conductor compositions, and excluding accelerating action such as that produced by dissolved oxygen, have demonstrated that in general, the measured corrosion current is an accurate and direct indication, through Faraday's law, of the corrosion rate, with the valence change of anodic reaction equal to the corrosion product valence. A small number of corrosion interface compositions have been found in which the corrosion current initiates the corrosion rate through a whole number anodic valence lower than corrosion product valence, implying that the corrosion continues through faster chemical reaction. Another small number of corrosion interface compositions have been found in which the valence of anodic reaction produces accurate measurement when taken as a greater whole number then corrosion product valences, apparently consequent to fractional deposition of corroded metal in the cathodic corrosion reaction.

DETECTION OF ACCELERATED CORROSION AND PROBLEMS OF MEASURING IT

The distinction made here between unaccelerated corrosion rate and accelerated corrosion rate is illustrated through the details of specific measurements described below. The results of these measurements in turn lead to a presentation of the problem of measuring accelerated corrosion rate, to which this invention is directed.

An illustration of unaccelerated corrosion rate was obtained with an ionic conductor composed of 13.0 g. sodium chloride dissolved in 323 cc. of distilled water held in a cylindrical container of 7.5 cm. diameter. The solution was deaerated by applying a layer of white mineral oil 1 cm. deep to shield against atmospheric oxygen, and then bringing the solution to its boiling point to expell dissolved oxygen. The solution was cooled to room temperature before introducing the electrodes. Duplicated electrodes of 1.0 x 2.5 cm. dimensions were cut from a thin sheet of low carbon steel, and included a small tab portion to which a lead wire was soldered. Accumulated surface oxide was substantially removed through fine abrasive polishing, immediately following which each electrode was weighed. The lead wires and tabs were then covered with water-proof insulation, the electrode surfaces were lightly polished with wet pumice powder to eliminate "water-break" upon rinsing, and the wet electrodes were introduced through the mineral oil layer into the salt solution. The wetted electrode surfaces repelled the mineral oil. The corrosion current was measured by the simplified method for duplicated electrodes of my U.S. Pat. No. 3,069,332, at spaced intervals during a total of 530 hours of corrosion, using an applied DC voltage of 0.02 volt, and taking the Direct Voltage as $E_d$=0.030 volt. The graph of corrosion current against hours defined a substantially linear relationship starting at 18 mma. and ending at 20 mma. at 530 hours. From this, total metal loss was calculated according to Faraday's Law of Electrolysis, operating through the anodic reaction, $Fe=Fe^{2+}+2(-)$, as $W_c=.00104(19)(530)=10.7$ mg. The electrodes were removed from the corrosive, rinsed, dried, and after complete removal of the insulating material, were again weighed. The weighed metal losses were 10.0±0.5 and 11.0±0. mg., averaging 10.5 mg. The measured corrosion current was an accurate measurement of the unaccelerated corrosion rate.

An illustration of accelerated corrosion rate was obtained from an additional run of this corrosion system, using fresh electrodes and solution, but made without initial deaeration and without the protective mineral oil layer. The graph of the measured corrosion current against the 430 hours during which the corrosion occurred, defined a substantially linear relationship at 29.0 mma. Metal loss calculated directly from this current-time relationship through the anodic reaction, $Fe=Fe^{2+}+2(-)$, was $W_c=.00104(29.0)(480)=14.5$ mg. The weighed metal loss on each of the two duplicated electrodes was 20.0±0.5 mg. This acceleration of the corrosion system by dissolved oxygen caused the corrosion rate calculated from the measured corrosion current to be in error by −26%.

A consideration of the correlation results of the above two illustrations indicated that in effect, the accelerating action of dissolved oxygen was equivalent to regarding the anodic reaction to occur at the reduced valence of, $V_x=(2.0)(14.5/20.0)=1.45$, but this did not suggest any generalized method of handling varying intensities of corrosion acceleration.

A further consideration suggested possible use of a devised empirical formula, $i_R=i_o^2/i_d$, where at any instant of time during the corrosion, $i_R$ is the rate-determining corrosion current operating at corrosion product valence, $i_o$ is the corrosion current measured on the corrosion system when accelerated by oxygen, and $i_d$ is the maximum corrosion current occurring in the deaerated corrosive.

Applying this to the above two illustrations, $$i_R=(29.0)^2/(19.0)=44.3$$

mma., from which metal loss is $$W_c=.00104(44.3)(480)=22.3$$

mg., representing only a ±11% error compared to the 20.0 mg. weighed metal loss.

This empirical relationship, $i_R=i_o^2/i_d$, was tested on corrosion interfaces with electrode composition ranging from aluminum to copper in the electromotive series, with alkaline, neutral and acid solutions, and with a form of corrosion cell in which the electrodes were mounted dry without precaution against oxide film formation after polishing, in which air in the cell was displaced by an inert gas, and in which the cell was filled with deaerated corrosive solution and then sealed against atmospheric oxygen. Initial corrosion current graphed against time, generally passed through a peak and then fell rapidly within about 3 to 25 hours, to a transition point of marked slope change, after which the corrosion current in general decreased at a much slower rate, and in particular decreased in manner characterized by the corrosion interface composition. The current at this transition point was taken as, $i_d$=maximum current operating at corrosion product valence with deaerated corrosive, and through the formula, $i_R=i_o^2/i_d$, produced correction for the initial current peak attributed to oxides.

The form of current-potential relationship obtained with low carbon steel corroded with deaerated acids, altered the significance attributed to the currents $i_o$ and $i_d$. In general, the measured corrosion current decreased after the $i_d$ transition point, but if the corrosion was continued over a long enough time it again increased and passed above the $i_d$ value where it then required handling through the formula, $i_R=i_0^2/i_d$. This illustrated application of the formula over a wider range of corrosion performance, but the current $i_0$ could no longer be regarded as that produced by oxygen acceleration, and the current $i_d$ could no longer be regarded as the maximum current produced by the deaerated corrosive. Current $i_d$ was replaced by the concept of a "bounding current," defined as the maximum unaccelerated corrosion current $i_B$, above which acceleration occurred. Current $i_o$ was replaced by the concept of "accelerated current," $i_A$.

The formula, $i_R=i_A^2/i_B$, was found to be of less value as the action of dissolved oxygen was increased. With corrosives exposed to the atmosphere but unstirred, the current-time relationship could not be relied upon to decrease to a minimum value for $i_B$ determination. The addition of corrosive solution flow, as through stirring, in general raised the corrosion current-time relationship well above the $i_B$ value, and the expedient of determining the $i_B$ value from a deaerated solution at the same flow rate was not regarded as an economically appealing alternative.

Another approach to the problem was investigated through corrosion current measurements made according to my U.S. Pat. No. 3,250,689, on the three electrode system including a measured electrode, an opposed electrode, and a reference electrode. Precision measurements made at a small polarization voltage such as 0.010 volt, indicated that the corrosion current $i_a$ measured from anodic polarization was substantially equal to the corrosion current $i_c$ measured from cathodic polarization when unaccelerated corrosion occurred. Accelerated corrosion caused $i_a$ to generally be greater than $i_c$, and in a number of instances accelerated corrosion rate was estimated through the relationship, $i_R=i_a^2/i_c$.

More detailed measurements made on corrosion cells with unchanged ionic conductor composition and corrosive environment, during the time when the corrosion current $i_{av}=(i_a+i_c)/2$, was increasing with time, demonstrated that a relationship between the quantity, $i_a$–$i_c$, and $i_{av}$, occurred in the form of a series of half-waves, in which the quantity $i_a$–$i_c$, consecutively increased from zero and returned to zero, and in which maximum half-wave amplitude and half-wavelength increased with increase of $i_{av}$ value. This phenomena is explained in terms of the corrosion mechanism of FIG. 1 herewith, as briefly described below, but is regarded to be of small practical value because its application to accelerated corrosion rate measurement is restricted to a series of precision measurements made at closely spaced time intervals on a corrosion system of fixed composition and environment, in which the corrosion current-time relationship undergoes a range of acceleration that includes substantial approach to unaccelerated corrosion.

The problem of attempting to measure accelerated corrosion rate in actual industrial systems is much more severe than that represented by the laboratory investigations summarized above. Corrosion occurring in the processing industries, as typified by open recirculating cooling towers, can include such factors as variations in composition of make-up water, continual and rapid changes in concentration, considerable variations in temperature, changes in pH, variation of flow rate, and miscellaneous variations caused by such factors as scale formation, bacterial contamination, and the use of different kinds of water treatment chemicals in varying concentrations. Industrial practice cells for a substantially instantaneous or very rapid method for measuring accelerated corrosion, thereby to control rapidly changing corrosion rates, undergoing wide range of change of acceleration intensity.

OBJECTS

A first object of this invention is the concept of that mechanisms of accelerated corrosion rate which explains the significance of accelerated corrosion current $i_A$ and of bounding current $i_B$, and which leads to definition of a mathematical relationship of these two currents to the rate-determining corrosion current $i_R$.

Another object is to provide a method for rapid and accurate measurement of the bounding current $i_B$.

Another object is a device for making the rapid and accurate measurement of bounding current $i_B$.

A further object is the measurement of acceleration intensity in tems of the corrosion currents $i_R$ and $i_B$.

A still further object is a simplified method for measuring the rate-determining corrosion current, $i_R$.

Other and more detailed objects become evident from an examination of the following detailed description and drawings.

THE FIGURES

Figure 8:
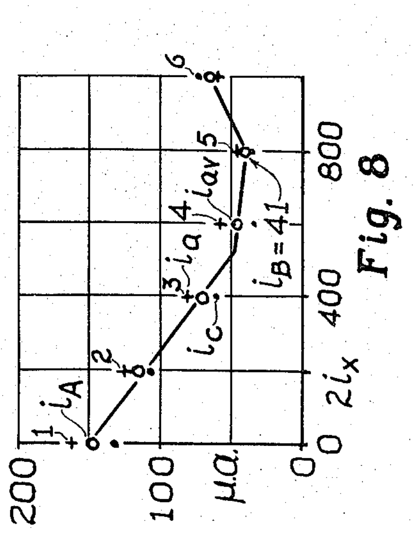
Figure 10:
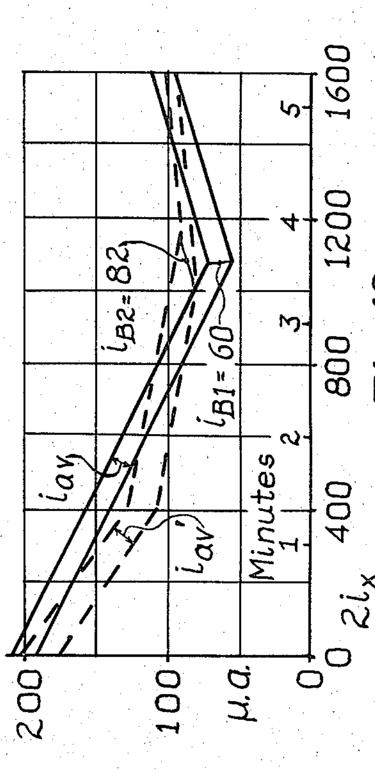
Figure 9:
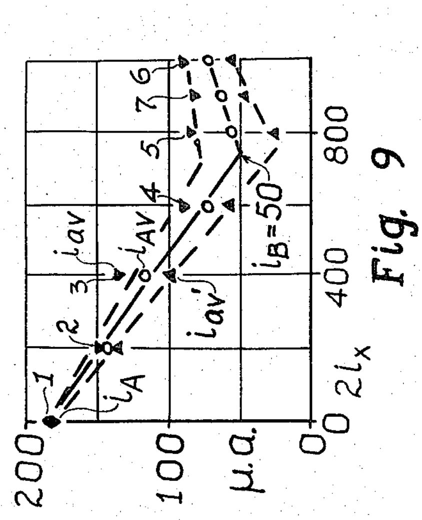
Figure 12:
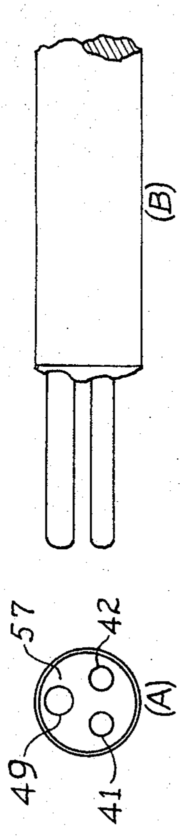
Figure 11:
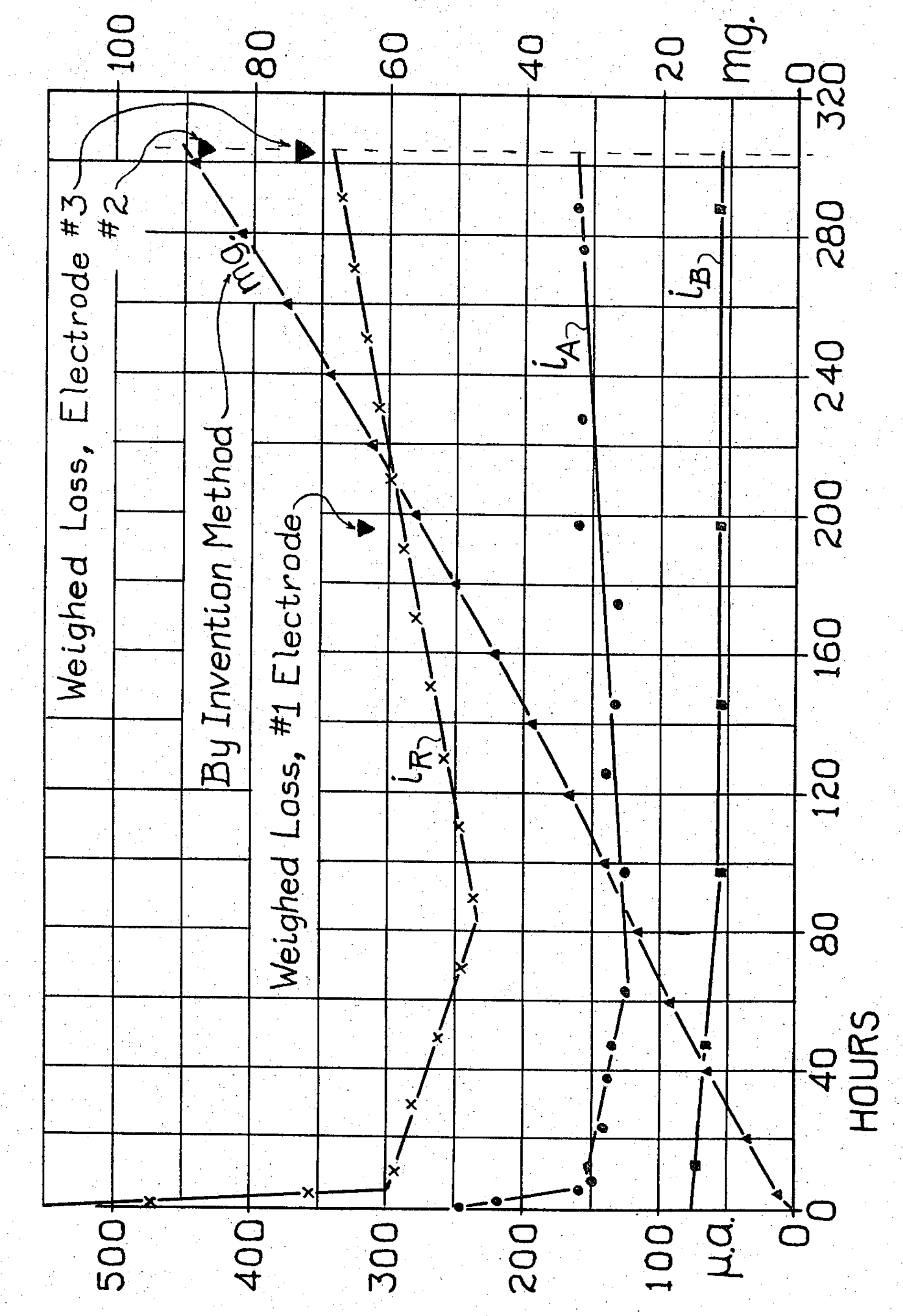

FIGS. 8, 9, and 10 show actual measurements made through this other method alternative in measuring current $i_B$ at selected instants of time during progress of corrosion;

FIG. 11 shows accurate measurement of accelerated corrosion rate by this other method alternative;

FIG. 12 shows a form of electrode probe for operation with this other method alternative.

THE ACCELERATION MECHANISM

Figure 1:
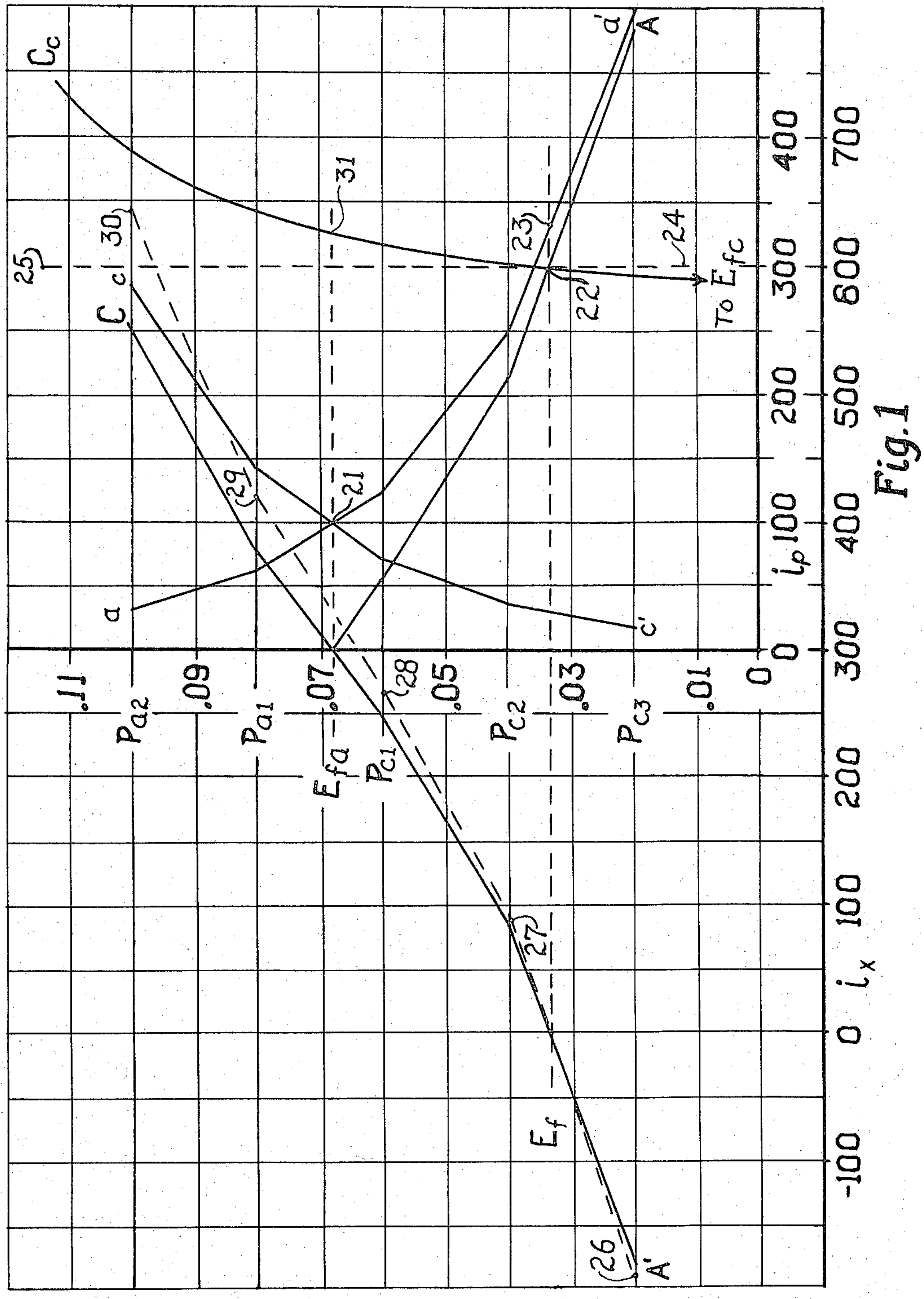
FIG. 1 shows the mechanism of accelerated corrosion rate through which the method of this invention operates.

FIG. 1 shows the corrosion mechanism furnishing the theoretical basis through which accurate measurements have been made according to this invention, with corrosion cells including wide variation ranges of electrode metal composition, ionic conductor composition, and corrosive environment including in particular, amount of dissolved oxygen and rate of ionic conductor flow. This figure is to be regarded as an illustrative generalized diagram, not limited to the showing of particular units of current and location of zero potential.

The top of FIG. 1 shows the interface electrode mechanism of a metal electrode surface undergoing unaccelerated corrosion at the free electrode potential $E_{fa}$. This mechanism is that of FIG. 3 of my patents above. The multi-linear relationship *a–a'* is that of total anodic conductance of the interface electrodes operating from free electrode potentials including $P_{a2}$, $P_{a1}$, $P_{c1}$, and $P_{c2}$, which occur at 0.2 volt separations. The multi-linear relationship *c–c'* is that of total cathodic conductance of the interface electrodes. $E_{fa}$–C shows the unaccelerated measurable resultant multi-linear cathodic current-potential relationship and $E_{fa}$–A shows the unaccelerated measurable resultant multi-linear anodic current-potential relationship. The unaccelerated corrosion current is shown at the point of intersection 21, between *a–a'* and *c–c'*, at potential $E_{fa}$, as 100 current units.

Accelerated corrosion is regarded to occur when a portion of the electrode surface area operates as a cathodic area from a free electrode potential $E_{fc}$, which differs from $F_{fa}$ by a comparatively large voltage. Some experimental measurements indicate that this difference may be of the order of 0.5 volt in the corrosion of iron. In the generalized showing made in FIG. 1, $E_{fc}$ may be regarded to occur at a potential somewhere below the figure boundary, and FIG. 1 shows only the pertinent portion of relationship $E_{fc}$–$C_c$. The point to be illustrated is that the cathodic conductance of this area is so comparatively small, and its cathodic polarization along curve $E_{fc}$–$C_c$ is so comparatively large that its shape no longer follows the decreasing slope multi-linearity of an interface electrode resultant, and instead, it approaches a vertical line at its point of intersection 22, with the $E_{fa}$–A relationship. It is to be understood that intersection point 22 can occur anywhere along the $E_{fa}$–A relationship according to the amount of acceleration taking place, and the specific showing is made for the purpose of illustration. The nature of this cathodic area is regarded to be determined from the nature of the corrosion interface composition and the corrosion environment, but for present purposes of understanding, it may be regarded to exist through such alternative causes as metal oxide, or a cathodic area of depolarization by dissolved oxygen, or an area of adhering cathodic material such as graphite. The causes of the cathodic area are of scientific interest, but the operation of the invention relies upon the theory that such a cathodic area causes the acceleration of the corrosion rate. In connection with this theory, it has been consistently observed that anodic and cathodic areas are visible on metal surface attacked by accelerated corrosion.

Corrosion of the electrode is accelerated by the short-circuiting of the anodic area conducting along relationship $E_{fa}$–A, to the cathodic area conducting along relationship $E_{fc}$–$C_c$. The intersection of these two relationships at point 22, defines the free electrode potential $E_f$, at which the electrode then corrodes. The short-circuit current at point 22 is shown as 300 units, but it does not entirely account for the corrosion rate. The rate-determining corrosion current, $i_R$, is defined from the total anodic interface electrode relationship a–a', at potential $E_f$, shown at point 23 as 332 units. It can be seen from inspection of the figure, that the difference between these points of current definition would increase when intersection point 22 occurs at smaller values of current. In the form of accelerated corrosion mechanism shown here, the current-potential relationship $E_{fc}$–$C_c$ of the cathodic area does not decrease rapidly in slope until well above the potential $E_{fa}$ of the anodic area, and this distinction is essential to the operation of the method of this invention.

METHOD OF MEASURING BOUNDING CURRENT $i_B$

The theory of method operation for measurement of accelerated corrosion current $i_A$ and bounding current $i_B$ is understood through reference to FIG. 1. If acceleration was absent, the measured electrode would corrode at potential $E_{fa}$. Bounding current $i_B$ would then be measurable, according to the method of my patents, as that polarizing current producing a polarization voltage of one-half of the Direct Voltage, $\frac{1}{2}E_d=0.015$ volt, as determined from current-potential proportionality with the then measurable line of steepest slope extending from potential $E_{fa}$ in the $E_{fa}$–A and $E_{fa}$–C relationships. Acceleration of the corrosion rate decreases the potential at which the electrode corrodes to that of $E_f$, as illustrated through intersection point 22. Accelerated corrosion current $i_A$ is measurable as that polarizing current producing a polarization voltage of $\frac{1}{2}E_d$ as determined primarily, because of the approach of relationship $E_{fc}$–$C_c$ to vertical position of infinite polarizability, from current-potential proportionality with the line or lines of the $E_{fa}$–A relationship extending on either side of point 22. In the presence of acceleration in actual practice, current $i_A$ is measurable, and the problem is how to measure current $i_B$ so that current $i_R$ can be determined from the measured values of $i_A$ and $i_B$.

One of the concepts of this present invention is that, if the corrosion interface could be polarized cathodically by increasing values of a current $i_x$ without interfering with my method of corrosion current measurement, then decreasing values of corrosion current would be measurable as the current $i_x$ was increased from zero to polarize the corrosion interface into lines of increasing slope of the $E_{fa}$–A relationship. Further increase of current $i_x$ to polarize the corrosion interface through potential $E_{fa}$ and into the decreasing line slopes of the $E_{fa}$–C relationship, would cause increasing values of corrosion current to be measured. Consequently the relationship between measurable corrosion current and increasing measurable values of current $i_x$ would pass through a minimum value of corrosion current. This minimum value of measured corrosion current would then be a measure of bounding current $i_B$, with a small positive error being caused by the deviation from vertical of the $E_{fc}$–$C_c$ relationship at potential $E_{fa}$. Measured values of corrosion current $i_A$ would include a smaller positive error caused by the closer approach of relationship $E_{fc}$–$C_c$ to vertical at potential $E_f$. It will be shown below that these positive errors in $i_B$ and $i_A$ measurement tend to be cancelled in the determination of $i_R$ in terms of $i_A$ and $i_B$.

In actual practice, the method for measuring bounding current $i_B$ may be regarded to offer two alternatives for applying cathodic polarizing current $i_x$ in a manner that does not interfere with measurement of the corrosion current during such cathodic polarization. In one alternative, range of relationship is measured between increasing values of cathodic polarizing current $i_x$ passed to a measured electrode from an opposed electrode, and resulting polarization voltage produced on the measured electrode as measured from a reference electrode. The range of current $i_x$ may start near zero so that initial small polarization voltage produces measurements of $i_c$ in the measurement of $i_A=(i_a+i_c)/2$. The range of relationship measurement is extended to measure the relationship line of greatest $\Delta e/\Delta i$ ratio, as evidenced by the next line at further $i_x$ increase showing a smaller ratio. Bounding current $i_B$ is measured as the current producing polarization of $\frac{1}{2}E_d$ as determined from proportionality with this largest $\Delta e/\Delta i$ ratio. This method alternative is described and illustrated below under the name, "extended range alternative."

In the other alternative, range of relationship is measured between increased values of cathodic polarizing current $i_x$ passed to the measured electrode from an anode electrode introduced for the purpose, and corrosion current as measured from a system of duplicated measured electrodes or of duplicated electrodes, one of which is measured and the other of which is the reference electrode. A value of current equal to $2i_x$ is passed from the anode and a value of current equal to $i_x$ is received by each of the duplicated electrodes, and the circuit passing this current must be isolated from the corrosion current measurement circuit to substantially avoid introducing error in measurement of the corrosion current. For this purpose, a circuit isolation device connects the series circuit of two duplicated isolation resistors $R_s$, across the two duplicated electrodes, and produces the total current $2i_x$ by applying variable DC voltage of proper polarity between the connection point of the two series resistors $R_s$ and the anode electrode, in which the ohmic value of isolation resistors $R_s$ is selected to be large enough to introduce negligible positive error in the range of corrosion current being measured. Under these conditions, a series of measurements are made of corrosion current and of value of current $i_x$ producing cathodic polarization during the corrosion current measurement, with different values of $i_x$ in this series being selected to determine the minimum value of corrosion current, which is taken as the measurement of bounding current $i_B$. This method alternative is described and illustrated below under the name, "circuit isolation alternative."

MEASUREMENT OF $i_R$ FROM $i_A$ AND $i_B$

Another concept of this invention is that value of rate-determining corrosion current $i_R$ can be determined from measured value of accelerated corrosion current $i_A$ and bounding current $i_B$ through the current-potential proportionalities of the Interface Electrode System, which proportionalities remain independent of size of specific current units, as described in my U.S. Pat. No. 3,156,631. This enables calculation to be made of the relationship between $i_R$ and $i_A$. This relationship which starts at the value, $i_A=i_B$, is found to be substantially linear, so that in practice of the method of this invention, $i_R$ can be easily calculated from a linear equation in terms of the measurable currents $i_A$ and $i_B$. A more detailed description is made through reference to FIG. 2, as follows.

Figure 2:
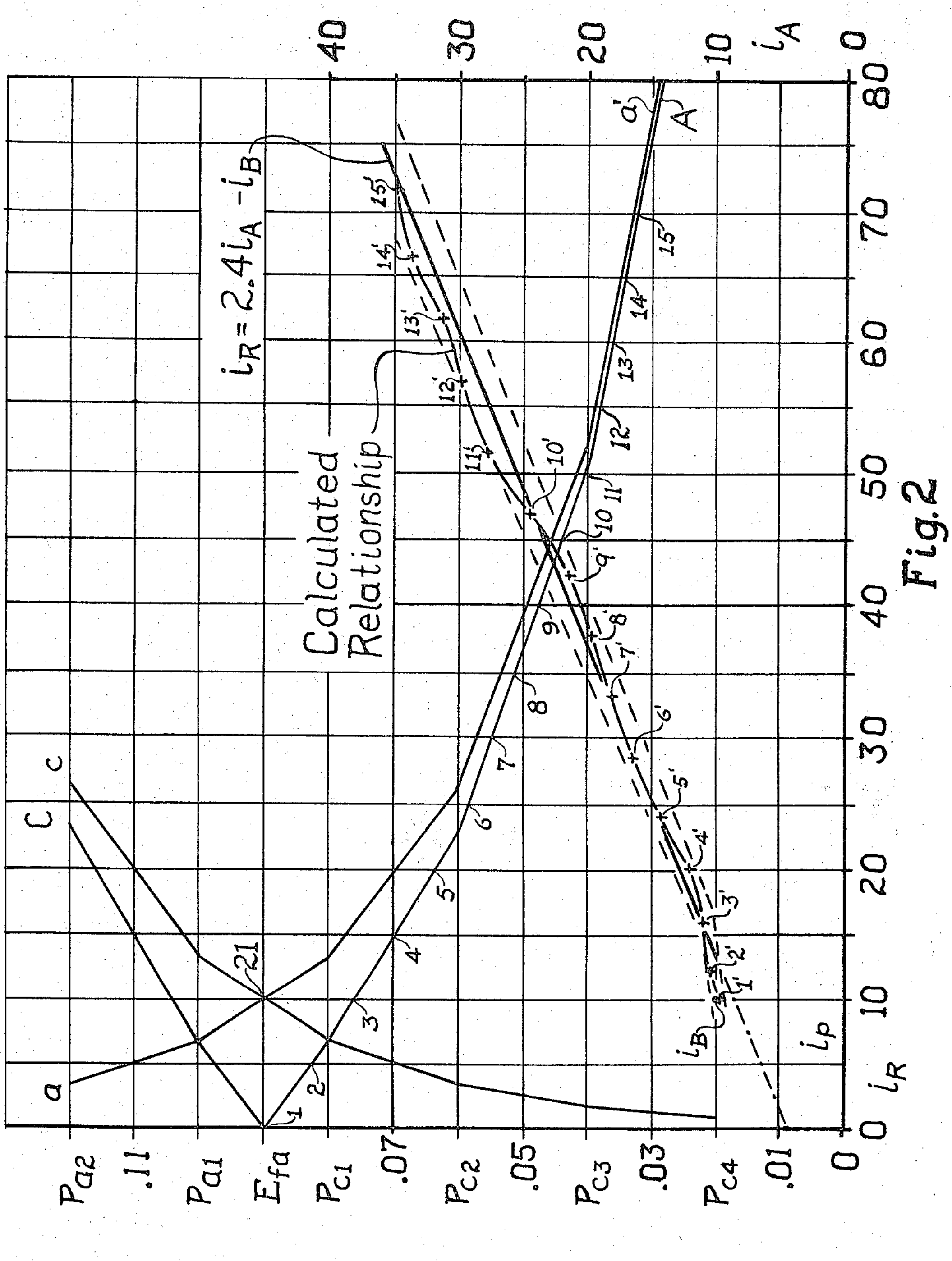
FIG. 2 shows rate-determining corrosion current $i_R$ mathematically related to measurable corrosion currents $i_A$ and $i_B$.

FIG. 2 shows another diagram of the Interface Electrode System drawn from an ordinate potential axis at the left of the figure and an abscissa polarizing current axis $i_p$, of unspecified current unit size, and includes the total anodic interface electrode relationship *a–a'*, and the resultant anodic current-potential relationship $E_{fa}$–A. The value, $i_B=10$, is taken from intersection point 21 between the *a–a'* and *c–c'* relationships. Points 1 through 15 are spaced along the $E_{fa}$–A relationship to locate points of potential and current from which corresponding values of $i_R$ are measured and values of $i_A$ are calculated from measurements. The same graphical measurements and calculations are made from each of these points, according to the following illustration made with point 7.

For the purpose of basing calculations upon clearly defined theoretical conditions, the cathodic current-potential relationship $E_{fc}$–$C_c$ of FIG. 1 is assumed to pass through each point, such as point 7, in a vertical direction representing infinite polarizability. This is justified in view of the finding that the linear equation of $i_R$ in terms of $i_A$ and $i_B$, the derivation of which is being here described, will show that the positive error caused by the slope of $E_{fc}$–$C_c$ being less than vertical at potentials $E_f$ and $E_{fa}$, tends to be cancelled out. As a consequence, calculation of current $i_A$ is determined entirely from $E_{fa}$–A relationship line slope, in the form of $i_A=(i_a+i_c)/2$, where $i_a$ is calculated as $i_a=i_{pa}(\frac{1}{2}E_d/.01)$, through proportionality with the current $i_{pa}$ required to produce 0.01 volt of anodic polarization and $i_c$ is calculated as $$i_c=i_{pc}(\tfrac{1}{2}E_d/.01)$$

through proportionality with the current $i_{pc}$ required to produce 0.01 volt of cathodic polarization. With point 7 located on the $E_{fa}$–A relationship at potential 0.055 volt and 30 current units, 0.01 volt of anodic polarization to potential 0.045 volt occurs along the $E_{fa}$–A relationship at 44.1 current units, from which is calculated, through $\frac{1}{2}E_d=0.0142$ volt, $i_a=(44.1-30.0)$ $$(.0142/.01)=20.0 \text{ current units}$$

Similarly, 0.01 volt of cathodic polarization to potential 0.065 volt occurs along the $E_{fa}$–A relationship at 18.9 current units from which is calculated, $i_c=(30.0-18.9)(.0142/.01)=15.8$ current units. Then, $$i_A=(20.0+15.8)/2=17.9 \text{ current units}$$

The value of $i_R$ is measured by extending the 0.055 volt potential at which point 7 occurs, to intersection with the *a–a'* relationship, which measures $i_R=32.9$ current units. Point 7' defining $i_A$, $i_R$ relationship is located from $i_A=17.9$ current units along the ordinate $i_A$ axis at the right of the figure and $i_R=32.9$ current units along the same abscissa axis as before, for convenience. Other points defining the $i_A$, $i_R$ relationship in this manner are summarized in Table I, which follows.

TABLE I.—THEORETICAL VALUES OF $i_A$ and $i_R$ AS DETERMINED FROM THE INTERFACE ELECTRODE SYSTEM

| | $i_a$ | $i_c$ | $i_A=(i_a+i_c)/2$ | $i_R$ |
|---|---|---|---|---|
| Measurement No.: | | | | |
| 1 | 9.5 | 9.5 | 9.5 | 10.0 |
| 2 | 11.1 | 9.2 | 10.4 | 12.6 |
| 3 | 11.2 | 10.2 | 11.0 | 16.3 |
| 4 | 12.1 | 11.2 | 12.0 | 20.1 |
| 5 | 16.5 | 11.8 | 14.2 | 23.9 |
| 6 | 19.9 | 12.8 | 16.4 | 28.2 |
| 7 | 20.0 | 15.8 | 17.9 | 32.9 |
| 8 | 20.0 | 18.5 | 19.5 | 37.7 |
| 9 | 22.8 | 20.0 | 21.4 | 42.4 |
| 10 | 28.7 | 20.3 | 24.5 | 47.0 |
| 11 | 35.2 | 20.0 | 27.6 | 51.9 |
| 12 | 37.6 | 21.9 | 29.8 | 56.9 |
| 13 | 27.2 | 24.7 | 31.0 | 62.0 |
| 14 | 37.6 | 28.8 | 33.2 | 67.0 |
| 15 | 37.6 | 31.8 | 34.7 | 71.9 |

The graphical relationship thus calculated between $i_A$ and $i_R$ is shown in FIG. 2 by the points 1' through 15', and can be regarded to define a substantially straight line within small oscillations caused by the multi-linearity of the current-potential relationships of the Interface Electrode System. The relationship begins with the start of accelerated corrosion at $i_B=10$ current units. The calculations are carried to the upper limit of $i_A/i_B=35/10=3.5$, representing the maximum ratio generally encountered in actual measurement of accelerated corrosion.

In FIG. 2, free electrode potential $E_{fa}$ is shown at the value of $P_{cl} \neq 0.010$ volt. The effect of possible $E_{fa}$ variation between the interface electrode potentials $P_{cl}$ and $P_{al}$ was determined from similarly calculated and graphed $i_A$, $i_R$ relationships obtained when the potential $E_{fa}$ was taken above potential $P_{cl}$ by 0.005, 0.015 and 0.020 volt. All such calculations are summarized by the dash lines of $i_A$, $i_R$ relationship shown in FIG. 2, within which the peak values of the relationship oscillations fall. This shows that the relationship remains substantially independent of $E_{fa}$ location between potential $P_{cl}$ and $P_{al}$, but adds the detail of a small second linear relationship occurring just above the $i_B$ value.

The derivation of a generalized mathematical expression for this $i_A$, $i_R$ relationship could be carried out through the refinement of expressions for two lines centered within the dash lines of FIG. 2, but this does not appear to be justified by the precisions within which measurement method theory and practice operate. By regarding these dash lines to represent the precision within which the $i_A$, $i_R$ relationship is defined from theory, the single straight line shown in FIG. 2 permits simplification with substantially no loss of precision. A straight line is generally expressed in the form of $y=m \neq bx$, where $m$ is the value of $y$ when $x=0$, and $b$ is the slope, $\Delta y/\Delta x$. In applying this to FIG. 2, $y=i_A$, $x=i_R$, and the expression becomes, $x=(y-m)/b=i_R=(i_A-m)/b$. The value of $b$ is determined from the averaging straight line of FIG. 2 as, $$b=(\Delta i_A/\Delta i_R)=35.0-10.0)/(74.0-14.0)=25/60$$

To determine the value for $m$, this averaging line is extended to $i_R=0$, by the dash-dot line in FIG. 2, where it intersects the $y$ axis at 4.2 current units along the $i_A$ current axis. It is important to note that $m$ cannot be then expressed as 4.2 current units in terms of $i_A$, because FIG. 2 is regarded to operate as a generalized proportionality independent of specific current units. Instead, it is expressed in terms of $i_B=10$ in FIG. 2, as $m=(4.2/10)i_B=0.42i_B$, so that its inclusion in the equation with $i_A$ operates the proportionality through the specific current units used in actual corrosion system measurement, and to furnish convenient showing in applying the requirement that the equation does not apply at values of $i_A$ at or below the $i_B$ value. By substituting these values in the above equation, $$i_R=(i_A-0.42i_B)(60/25)$$

simplifying to $i_R=2.4i_A-i_B$. The method of this invention should not be regarded as limited in application to this specific equation, and the method may alternatively be applied through other equations producing greater or lesser precision.

MEASUREMENT OF $i_B$ By EXTENDED RANGE ALTERNATIVE

Method operation through the extended range alternative is illustrated by reference to FIG. 1, as follows. Resultant range of unaccelerated anodic current-potential relationship $E_{fa}$–A, is also shown in FIG. 1 in the position of 180° rotation through the voltage axis, in the form of relationship A'–$E_{fa}$. In the absence of acceleration, the current-potential relationship range of A'–$E_{fa}$ and $E_{fa}$–C are in a form described in my U.S. Pat. No. 3,156,631 when the method is operated through an X–Y recorder. If the corrosion was unaccelerated, the measured electrode would be corroding at the free electrode potential shown in FIG. 1 as $E_{fa}$, and polarizing current would be measured along the upper current axis.

According to the acceleration mechanism of FIG. 1, one consequence of the unaccelerated electrode area being short-circuited to the cathodic area producing relationship $E_{fc}$–$C_c$ is that the free electrode potential at which the electrode corrodes, is decreased to the potential $E_f$ defined from the intersection point 22. This is turn shifts the zero of the current axis to the position defined by the intersection of potential $E_f$ with relationship $E_{fa}$–A', as is shown by the lower current axis.

Another consequence of this corrosion acceleration is that measurable range of current-potential relationship is altered by the polarizing current requirements of the $E_{fc}$–$C_c$ relationship, which requirements are measurable in FIG. 1 from the vertical line 24–25 drawn through intersection point 22. At any potential within the A'–$E_{fa}$–C relationship range, the amount of current added by the $E_{fc}$–$C_c$ relationship is equal to the amount of current by which the $E_{fc}$–$C_c$ relationship is separated from line 24–25. For example, at potential $P_{c3}$, relationship $E_{fc}$–$C_c$ adds 5 current units to the anodic current required to polarize to this potential, as shown in FIG. 1 by point 26, while at potential $P_{a2}$, 92 current units are added to the cathodic current required to polarize to this potential, as is shown by point 30. In this manner the current-potential relationship theoretically measurable in the presence of the accelerated corrosion is defined from points 26 through 30, which are shown consecutively connected by dash lines.

The accelerated corrosion current $i_A$ is measurable with the electrode system including a measured electrode, an opposed electrode, and a reference electrode, according to my U.S. Pats. Nos. 3,156,631 and 3,250,689. To illustrate, 0.010 volt of anodic polarization from potential $E_f$ downward along line 27–26, occurs at an anodic polarizing current of 143 units. According to proportionality through $\frac{1}{2}E_d=0.0142$ volt, $$i_a=(143)(.0142/.010)=203$$

current units. The 0.0142 volt value for $\frac{1}{2}E_d$ averages the effect of free electrode potential variation between potentials $P_{cl}$ and $P_{al}$ with corrosion current measurements made at 0.010 volt polarization. Cathodic polarization of 0.010 volt from potential $E_f$ upward along line 26–27 and into line 27–28, occurs at a cathodic polarizing current of 117 units, so that $i_c=166$ units. Taking the average, $i_A=(203+166)/2=185$ units.

Bounding current $i_B$ is measured according to the extended range alternative, from the current-potential relationship produced by cathodic polarizing current $i_x$ applied through a range to define the line of greatest $\Delta e/\Delta i$ ratio. The lower current axis of FIG. 1 shows units of $i_x$ current. This current-potential range is preferably measured through continuous DC voltage application to the measured and opposed electrodes at a selected rate of change and according to other details described in the example following below, during which the resulting current-potential relationship is recorded. The measurement is continued for the purpose of measuring the line of greatest $\Delta e/\Delta i$ ratio, as generally determined by measurement into one or more lines of lesser $\Delta e/\Delta i$ ratio. By way of illustration through FIG. 1, measurement through lines 26–27, 27–28, and 28–29 produce increasing slope or $\Delta e/\Delta i$ ratio, following which line 29–30 is of lesser slope. According to the theory of the measurement method, bounding current $i_B$ is measured from the line of greatest $\Delta e/\Delta i$ ratio. In FIG. 1, this is line 28–29, along which 0.010 volt of polarization is produced by 80 current units, from which bounding current is measured as $i_B = (80)(.0142/.010) = 113$ units.

Additionally, according to measurement theory described above, the rate-determining corrosion current is measured through the current-potential proportionalities of the Interface Electrode System as, $i_R = 2.4(i_A) - i_B = 2.4(185) - 113 = 331$ units, which checks closely with the showing in FIG. 1, of point 23 at 332 units.

EXAMPLE 1

Demonstration of Extended Range Alternative

The corrosion of iron by salt solution was selected for this example because it is regarded as one of the systems most frequently encountered in industrial applications. The corrosion cell was arranged so that measurements could be made by both method alternatives of this invention, for comparative purposes.

A cylindrical glass container of 16 cm. diameter and 16 cm. depth was filled with 2,500 cc. distilled water in which was dissolved 25.0 g. sodium chloride. A stirrer in the form of a glass rod with rectangular 2 x 6 cm. plastic impeller mounted at one end, was positioned with the rod vertically centered in the container and the impeller near the bottom of the container. This stirrer was rotated at 120 r.p.m. throughout the corrosion. Three electrodes were prepared from 1018 steel rod by polishing through #280 grit size to remove surface imperfections and to reduce the rod diameter to 0.4 cm., and they were weighed. Each end of each electrode was shielded to expose a 3.0 cm. length of electrode, and electrodes #2 and #3 included shielded lead wires for measurement purposes. The electrodes were mounted in vertical and parallel position at 2.0 cm. distance from the container wall, with upper surface 2 cm. below the liquid level. Electrode #2 was separated from #3 by 2 cm., and was "upstream" from electrode #3 with regard to direction of solution flow. Electrode #1 was separated from the other two by downstream positioning along about ¼ of the container circumference. The corrosion was operated at a room temperature of about 70° F. Evaporation loss was replaced with distilled water.

At selected times during progress of the corrosion, range of current-potential relationship was measured according to my U.S. Pats. Nos. 3,156,631 and 3,250,689, for the purpose of determining the values of corrosion currents $i_A$ and $i_B$. Measurements were made on the #2 electrode. At the time of making each measurement, an iron electrode of similar size and composition was used as the opposed electrode, and was submerged into the solution at the opposite side of the container wall. After making each measurement, this electrode was removed. It was found that with this corrosive of good conductivity, the reference electrode could be alternatively the electrode here designated as #3, or a calomel electrode positioned to place the measured electrode between it and the opposed electrode. The measured range was started with anodic polarization voltage of the order of 0.015 volt, and was continued a line or two past the line of steepest slope of cathodic polarization range. The steepest slope was visually recognizable during the making of the measurement, and generally occurred below 0.14 volt of cathodic polarization in this example. Such measurements were made through the method alternative of continuous automatic DC voltage delivery to the electrodes at substantially constant selected rate of change, with the measured values directly recorded on graph paper. The attempt to measure such a large range through the method alternative of manual apparatus adjustment and visual readings of a series of current and potential measurements would be regarded as impractical for several reasons. An excessive amount of effort and time would be required, and the measured relationships might include substantial errors accumulated through the combined effects of extended time of applied cathodic polarization and of changes in the naturally occurring corrosion rate during the total time required for the measurements. However, the method of this invention is nevertheless regarded to include this alternative.

Measurement in the direction of decreasing anodic polarization followed by increasing cathodic polarization has distinct advantages over attempting this measurement in the reverse direction The values of $i_a$ and $i_c$ in $i_A$ measurement made on each side of potential $E_f$, are the most critical from the viewpoint of precision, being larger than $i_B$, and being multiplied by the factor, 2.4, in determining $i_R$, and are measured before any significant disturbance of interface performance by the quantity-time factor of the polarizing current. Additionally, measurement of the line of steepest slope indicates that the measurement can be stopped thereafter. If instead, the range measurement was started at maximum cathodic polarization, it would be difficult to judge what this maximum should be without knowning the potential at which the line of steepest slope occurred. However, the method of this invention is nevertheless regarded to include this alternative.

Figure 3:
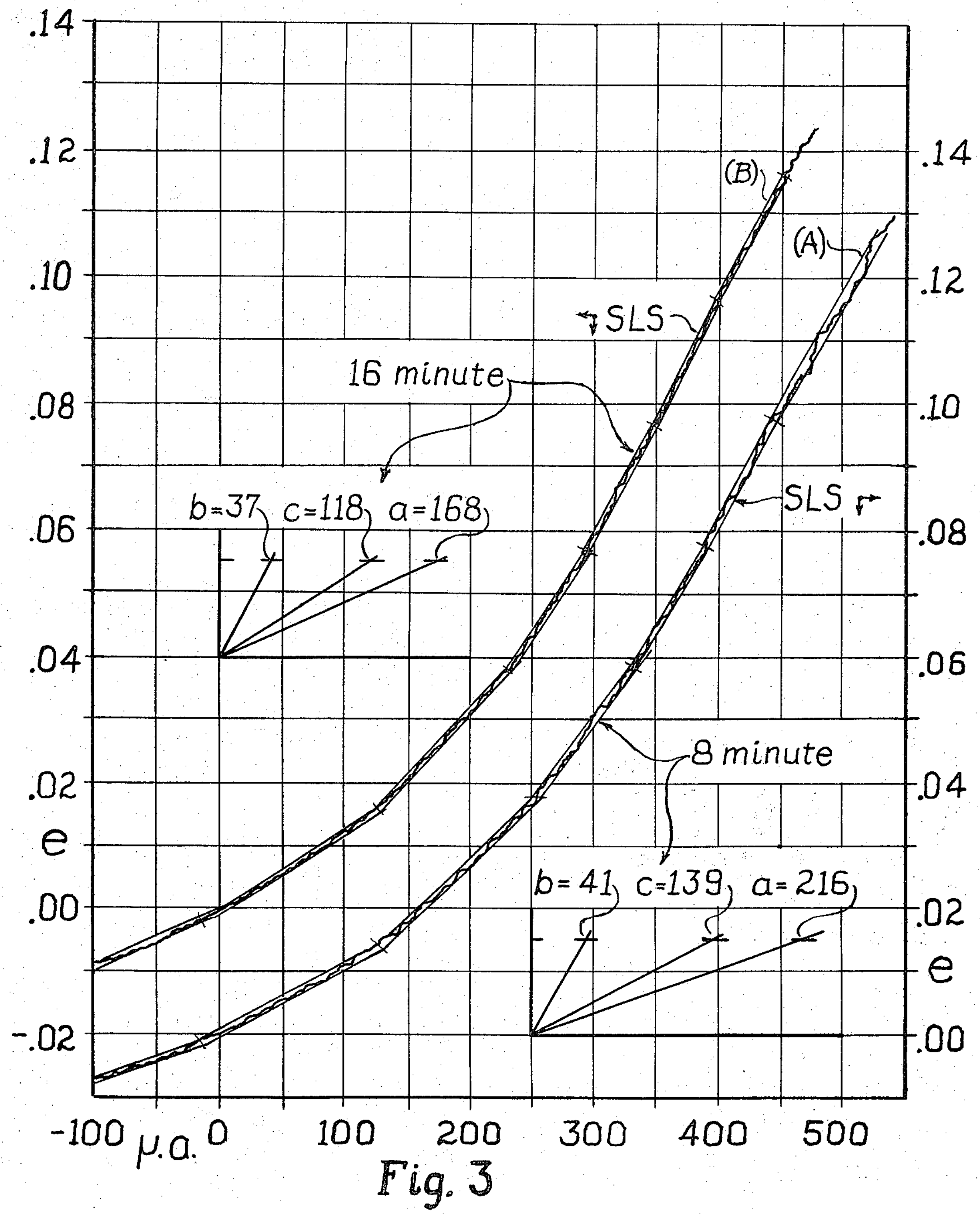
FIG. 3 shows form of measurement made through one method alternative of this invention, and measurement of currents $i_A$ and $i_B$.

FIG. 3 illustrates the form of cathodic current-potential relationship generally obtained in the range measurements, and also the effect of doubling the traverse time through which the range is measured. The lower relationship A, with voltage axis at the right, was obtained with a traverse time of 8 minutes. The upper relationship B, with voltage axis at the left, was obtained with a traverse time of 16 minutes. These measurements were made consecutively after the corrosion had continued through 300 hours. The earlier measurements were made at the average of these two traverse times, about 12 minutes. The slightly wiggly lines are those of the X–Y recordings. They are bounded by straight lines drawn in later, which define more clearly the multi-linearity and the transition points occurring at the 0.02 volt separations. The separation distance between parallel bounding lines on measured relationship B, is substantially equal to the separation distance obtained with this recorder when measuring the straight line current-potential relationship of a fixed ohmic resistor at the rate of voltage delivery used in this example. The slightly greater bounding line separation distance of relationship A measured at a faster traverse time is attributed to lag in cell response to voltage increments delivered from the wire-wound voltage delivery potentiometer. The use of manually drawn bounding lines is not essential to the method of this invention, but it is an aid when voltage delivery and recording systems are less than perfect.

The effect of traverse time on the precision of measuring currents $i_A$ and $i_B$ is demonstrated through FIG. 3, in which the two measured ranges of current-potential relationship show the effect of doubling traverse time, from 8 to 16 minutes, when range of measured cathodic polarization extends to 0.15 volt. Inspection of FIG. 3 shows that in each measurement, the line of steepest slope occurs within the same range of cathodic polarization, 0.077 to 0.097 volt, which is in accord with the earlier finding described in my patents, that Transition Point potential remains substantially independent of traverse time. FIG. 3 also shows line slopes taken from the measured ranges over a span of 0.015 volt of polarization, to measure the polarizing currents of, $a$=anodic polarization from potential $E_f$, $c$=cathodic polarization from potential $E_f$, and $b$=polarizing current along the line of steepest slope within which potential $E_{fa}$ occurs.

Bounding current is measured from the 8 minute traverse as, $i_B=(41)(.0142/.015)=38$ mma., and from the 16 minute traverse as, $i_B=(37)(.0142)(.015)=35$ mma., from which the averaged value can be expressed as 36.5 mma. ±4%. This showing that bounding current measurement is substantially independent of the two traverse times is in agreement with the theory of FIG. 1 in which $i_B$ is regarded as being substantially a measurement of unaccelerated corrosion current, the measurement of which was previously described in my patents as being reasonably independent of traverse time beyond that required to approach initial current-potential equilibrium.

The accelerated corrosion current, $i_A=(i_a+i_c)/2$, is measured from the 8 minute traverse as, $$i_A=(216+139)(\tfrac{1}{2})(.0142/.015)=168$$

mma., and from the 16 minute traverse as, $$i_A=(168+118)(\tfrac{1}{2})(.0142/.015)=136$$

mma., from which the averaged value can be expressed as, $i_A=152$ mma. ±11%. This showing that accelerated corrosion current $i_A$ is somewhat dependent upon traverse time, would be expected from theory, since $i_A$ is measured by anodic and cathodic polarizations from the free electrode potential $E_f$, at which potential the naturally occurring acceleration is at the maximum. In theory, extended duration of anodic polarization could decrease current $i_a$ through increase of anodic area of electrode surface while decreasing cathodic surface area. Extended duration of cathodic polarization could decrease current $i_c$ through slightly increased demand upon oxygen depolarization and through slight increase in alkalinity of the ionic conductor film contacting the electrode surface, which in turn tends to reduce the corrosivity. Regardless, the method of this invention is not restricted to traverse time producing maximum accuracy in correlation with weight loss measurement, and the traverse speed of about 0.15 volt of polarization in 12 minutes produced good accuracy in this example and with other corrosion systems summarized below.

Figure 4:
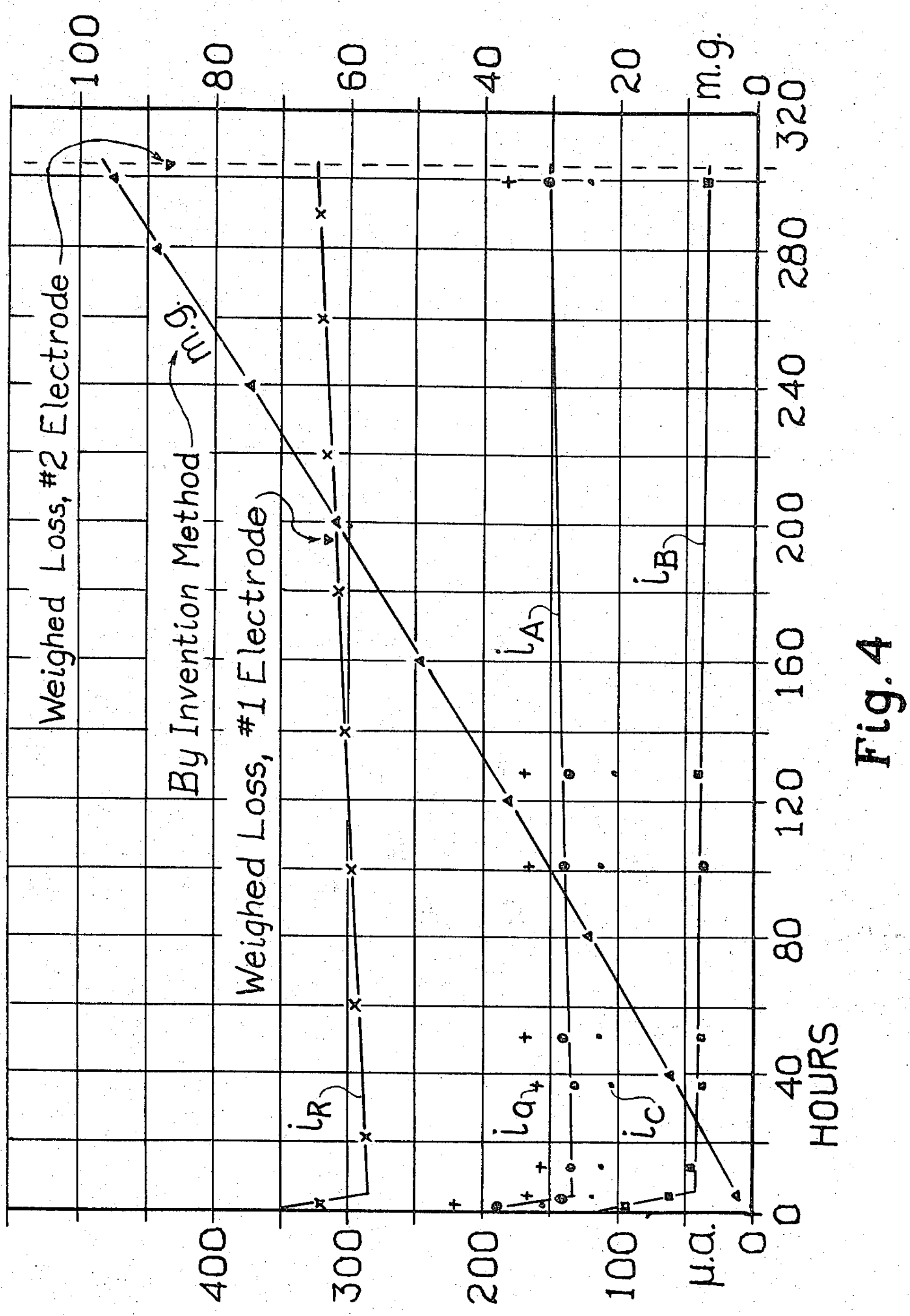
FIG. 4 shows accurate measurement of accelerated corrosion rate by this one method alternative.

The corrosion current measurements made in this example are clearly shown as points located in the current-time graph of FIG. 4, which includes the points of $i_B$ measurement, and $i_A$ measurement points in terms of $i_a$, $i_c$, and $i_A=(i_a+i_c)/2$. In calculating the values of $i_R$ through the relationship, $i_R=2.4(i_A)-i_B$, the values of $i_A$ and $i_B$ were the averaged values taken over each time interval selected in the integration of current-time relationship into quantity-time relationship through Faraday's law. Each calculated $i_R$ value is located as a point in the center of the time interval from which it was calculated, and each calculated value of total milligrams of metal loss is located at the end of the time interval from which its sum was calculated. Anodic valence change of two was taken according to the anodic reaction, $Fe=Fe^{2}+2(-)$, and applied according to calculations illustrated above.

The results of the measurements demonstrate the precision within which properties of the Interface Electrode System have been described, and verify the concepts of its performance in accelerated corrosion. At 196 hours of corrosion, the milligram-time relationship shown in FIG. 4 then indicated a metal loss of 61.0 mg. on measured electrode #2. The #1 electrode, which had remained entirely undisturbed through its corrosion, was then removed from the solution, the corrosion products were removed by light brushing during rinsing, the surface was dried, and weighed metal loss was measured 63.6 mg. Bearing in mind that a large volume of weight loss measurements made previously on duplicated electrodes such as #1 and #2, has shown that the average precision of a single measurement is about ±5%, it is not too significant to observe that the metal loss measured by the method of this invention differs from the weighed loss by $$(61.0-63.6)(100)/(63.6)=-4.1\%$$

Since both measurement methods have sources of known and unknown errors, the extent of correlation is more significantly expressed as percentage of deviation from the averaged measured value, which is 62.3 mg. ±2.1%, from which it is more evident that the correlation is within the probable precisions of the two measurement methods. Upon termination of the corrosion at 304 hours, the milligram-time relationship indicated metal loss of 97.0 mg. on the #2 measured electrode, and weighed metal loss on this electrode was 87.0 mg. Metal loss measured by the method of this invention differed from weighed loss by $(97.0-87.0)(100)/(87)=+11.5\%$, but the measured value averaged from the two methods was 92.0 mg. ±5.4%.

As stated above, the rapid initial decrease in corrosion current is attributed to breakdown of initial metal oxide film. The minimum accelerated corrosion current, $i_A=135$ mma. at 5 hours, is far above $i_B=42$ mma., thus illustrating the problem encountered in attempting to measure $i_B$ value from initial minimum $i_A$ value. The intensity of the acceleration produced by the combined factors of dissolved oxygen and flow rate, can be expressed by the ratio, $i_R/i_B$. At 5 hours this ratio is 285/42=6.8, while at the end of the corrosion it increased to 327/37=8.9, thus indicating the seriousness of accelerated corrosion when not minimized by inhibitor. The electrodes which were cleaned and dried before final weighing, show sharply defined boundary between large areas of localized anodic and cathodic action, but the anode areas show no pitting.

While actual measurements such as those shown in FIG. 3 were treated in the detail of showing multi-linearity for the purpose of demonstrating operation of the Interface Electrode System in the accelerated corrosion mechanism, it is within the scope of this invention to simplify through regarding such measured current-potential relationships as smooth curves, and to measure current $i_A$ from the slope of a tangent line drawn through the point of $E_f$ potential and zero $i_x$ current, and to measure current $i_B$ from the slope of a tangent line drawn through the point of largest $\Delta e/\Delta i$ ratio.

SIMPLIFIED MEASUREMENT OF $i_R$

The method of this invention includes a simplified method of measuring rate-determining corrosion current $i_R$ within precision acceptable in many industrial control operations, and which also can give a qualitative indication of acceleration intensity. The theory through which this simplification operates is explained by reference to FIG. 1. It was shown above that when cathodic polarizing current $i_x$ polarizes the measured electrode to the potential of the line of greatest $\Delta e/\Delta i$ ratio, the polarized electrode potential is substantially equal to the potenial $E_{fa}$. A this potential, anodic conduction along relationship $E_{fa}$–A has decreased to zero, and current $i_y$ is passed entirely to the cathodic area operating along relationship $E_{fc}$–$C_c$. The value of $i_x$ is then a measure of the current along relationship $E_{fc}$–$C_c$ at potential $E_{fa}$, shown in FIG-1 by the point 31 at 326 current units on the upper current axis. FIG. 1 may be alternatively viewed as showing that a current of 326 units on the lower $i_x$ current axis polarizes the corrosion interface to potential $E_{fa}$ along line 28–29 of steepest slope. FIG. 1 shows further, that the 326 current units at point 31 approximates the value of $i_R=332$ units at point 23, to an extent depending upon the amount of slope of the $E_{fc}$–$C_c$ relationship between potentials $E_f$ and $E_{fa}$. Thus, the value of cathodic polarizing current $i_x$ passed to the measured electrode when its current-potential relationship its polarized along the line of greatest $\Delta e/\Delta i$ ratio, is a measure of rate-determining corrosion current $i_R$. Additionally, the intensity of corrosion acceleration is qualitatively indicated from the polarization voltage at which the greatest $\Delta e/\Delta i$ ratio occurs, which in FIG. 1 is the separation voltage between potentials $E_{fa}$ and $E_f$.

Application of this simplified measurement to the cathodic current-potential relationships that produced the $i_B$ measurements shown in FIG. 4, is summarized in Table II which follows. The tendency toward positive error in the practice of this simplified method can be corrected for by taking the $i_x$ measurement point from a reference point of lower $i_x$ value, such as at the beginning of the steepest slope line, as illustrated in Table II.

TABLE II.—SIMPLIFIED METHOD OF $i_R$ MEASUREMENT

| | Hours | $i_R = i_x$ [1] |
|---|---|---|
| Measurement No.: | | |
| 1 | 1.8 | 390 |
| 2 | 4.3 | 395 |
| 3 | 12.5 | 295 |
| 4 | 36.8 | 340 |
| 5 | 50.3 | 420 |
| 6 | 101 | 390 |
| 7 | 128 | 360 |
| 8 | 300 | 385 |

[1] At beginning of steepest slope line.

The milligram-time relationship obtained from integration of the current-time relationship of Table II indicates 304 hour metal loss as 124 mg., representing a +42% error from the weighed metal loss of 87.0 mg. on the measured #2 electrode. Error of this size is frequently acceptable for purposes of industrial corrosion control where precision of measurement may not always be required, particularly when even the simplest calculations by control personnel are avoided when possible. This simplified method reduces measurement to visual observation of recorded current-potential relationship such as in FIG. 3, and entirely avoids the line slope measurements required in measuring $i_a$, $i_c$, and $i_B$, and the calculations required for determining $i_A$, $i_B$, and $i_R$.

CIRCUIT ISOLATION DEVICE

Figure 5:
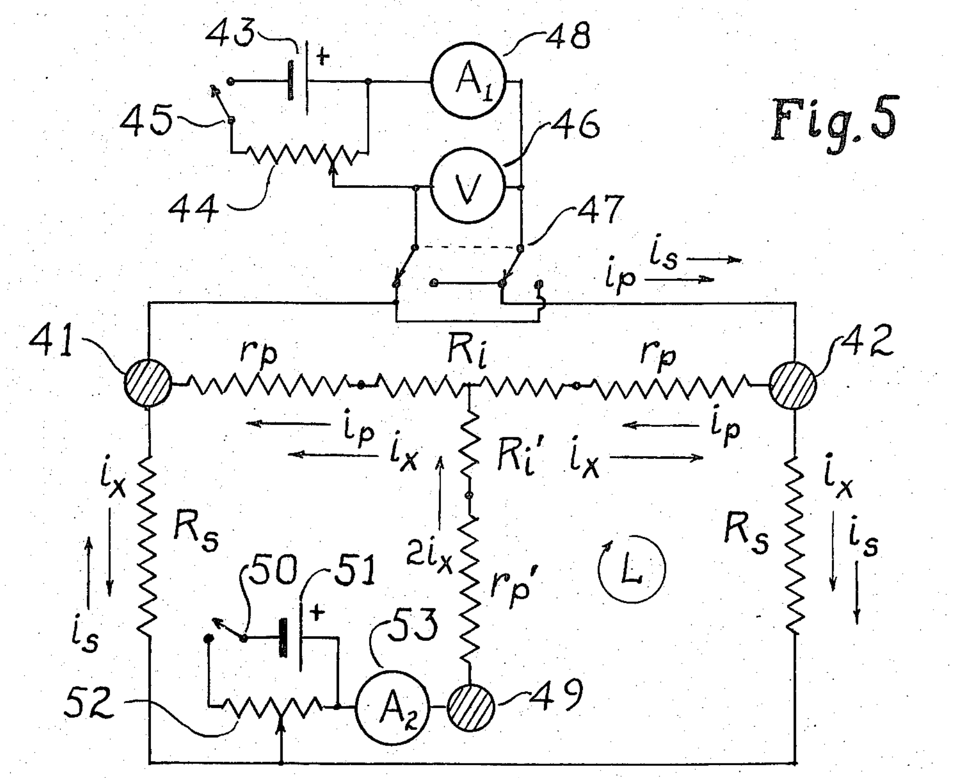
FIG. 5 is a diagram of the basic circuit of the device through which the other method alternative of this invention is operated.

FIG. 5 shows essential details of a circuit for cathodically polarizing electrodes during bounding current measurement, without introducing any significant disturbance to the operation of the corrosion current measurement circuit. It is shown connected to duplicated electrodes 41 and 42.

The corrosion current measurement circuit operates according to my U.S. Pat. No. 3,069,332, as follows. Battery 43 is connected to potentiometer 44 by closing switch 45. The voltage delivered across voltmeter 46 is adjusted by positioning the arm of potentiometer 44, and passes through the polarity reversing switch 47 to the electrodes 41 and 42. Votmeter 46 may be of a type drawing substantially no current, so that microammeter 48 measures the polarizing current, $i_p$. Usually the DC voltage applied to duplicated electrodes is selected as 0.02 volt, plus any additional voltage added to compensate for voltage loss through the ionic conductor. At the time selected for taking the measurements, the polarizing current $i_p$ produces substantially 0.010 volt of anodic polarization on the one electrode and 0.010 volt of cathodic polarization on the other electrode. The reversing switch 47, reverses the direction of the current passed between the electrodes, to produce a second measurement for obtaining an average from the two measurements. Electrode polarization resistance is diagrammatically represented as $r_p$, and ionic conductor resistance between the opposed electrodes is diagrammatically represented as $R_i$.

In the circuit for cathodically polarizing electrodes 41 and 42 during bounding current measurement, an additional electrode 49 is required. It may be used in alternative shapes and positions described below, but for present purposes illustrating precision measurement, it is in the form of a third duplicated electrode. It is positioned equidistant from electrodes 41 and 42, so that it can pass a substantially equal cathodic current to each of them, and its positioning for this criteria becomes less critical with increase in its separation distance. The circuit diagram indicates such positioning by showing that its path of conduction through its polarization resistance $r_p'$ and through part of the ionic conductor resistance $R_i'$, operates through the center of the ionic conductor resistance $R_i$ between electrodes 41 and 42. The closing of switch 50 connects battery 51 to potentiometer 52, and the position of the potentiometer arm adjusts the voltage applied between electrode 49 operating as an external anode and electrodes 41 and 42, each receiving the externally applied cathodic current $i_x$. Meter 53 measures the current, $2i_x$. An isolation resistor $R_s$, is in series with the lead from anode electrode 49 to each of the duplicated electrodes 41 and 42, and these resistors operate to avoid interference with the corrosion current measurement circuit, as follows.

Operation of the equal isolation resistors $R_s$, becomes easily visualized through the following analysis. As the value of these resistors is decreased toward zero, their connection to electrodes 41 and 42 places an ohmic resistance of decreasing value across the corrosion current measurement circuit, and introduces an increasing positive error in its current measurement. This effect decreases as the value of resistors $R_s$ is increased, but such increase also increases the voltage drop across them produced by current $i_x$, which in turn increases the voltage requirement of battery 51. The compromise between these two effects can vary with choice in circuit design and still be within the scope of this invention, and the following illustrates one form of specific design, as follows.

Figure 6:
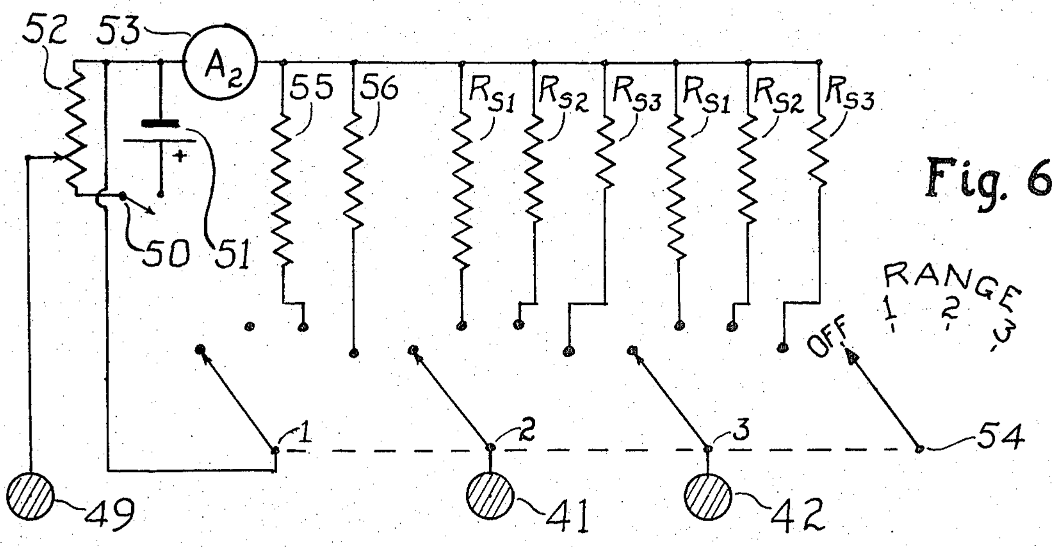
FIG. 6 is a diagram of the circuit of a specific form of the device through which this other method alternative is operated.

An example of a form of isolation device for producing the cathodic polarization during bounding current measurement is shown in FIG. 6. The connection of isolation resistors $R_s$, to electrodes 41 and 42, and the selection of a plurality of range values for the $R_s$ resistors and for the microammeter shunts is accomplished through the three-pole, four-position selector switch 54. In the "off" position, no connection is made to electrodes 41 and 42. The Range 1, 2, and 3 positions connect increasing range values of $R_s$ to the electrodes through poles 54–2 and 54–3. In the Range 1 dial position, meter 53 operates without a shunt. In the Range 2 and 3 positions, pole 54–1 connects corresponding range multiplier shunts across meter 53. A fourth switch pole, not shown, could operate as switch 50, to connect battery 51 with the connection of the $R_s$ resistors.

By way of specific illustration of FIG. 6, the circuit values for one form of its operation are summarized in Table III which follows below. Operation is divided into three decade ranges of meter 53 operation, starting with a 10 to 100 mma. range. Operating instructions call for starting with the smallest range, and switching to the next higher range only when meter 53 is about to go off scale. This also requires reducing the voltage delivered from potentiometer 52 before switching to a next higher range.

The ohmic value of separation resistor $R_s$ is determined through the criteria that it produce only a certain maximum error in the smallest value of corrosion current to be measured within the range in which the $R_s$ resistor is connected. The series of concepts through which this criteria is met, is illustrated with Range 1 of FIG. 6, as follows.

FIG. 5 shows that meter 53 measures the current, $2i_x$. The Range 1 span of 10 to 100 mma. for meter 53, as selected and shown in Table III below, therefore represents an $i_x$ span of 5 to 50 mma. of cathodic current applied to each electrode. The minimum value of current $i_R$ measurable in Range 1 would then be about 5 mma., since it was shown in the illustration of bounding current measurement theory that the cathodic polarizing current $i_x$ producing the minimum or $i_B$ value of measured corrosion current is a reasonably accurate measurement of the rate-determining current $i_R$. This value of $i_B$ can be calculated through the relationship, $i_R=2.4(i_A)-i_B$. The minimum value of $i_B$ would occur with the largest intensity of corrosion acceleration generally encountered in practice, such as when $i_A/i_B$=about 3.5, from which $i_A=3.5i_B$. Then, by substituting the values above, $$i_x=5\text{ mma.}=i_R=2.4(3.5i_B)-i_B$$

from which $i_B=0.677$ mma. Since the polarizing current $i_p$, measured by meter 48, is converted to the corrosion current $i_{av}$, through the proportionality, $i_B=i_p(E_d/e_p)$, the minimum Range 1 current measured by meter 48 is, $i_p=(0.677)(.020/.0284)=0.477$ microampere. The current $i_s$, shown in FIG. 4 as passed through resistors $R_s$ by the DC voltage applied to the electrodes for corrosion current measurement, is expressable as, $i_s=e_p/2R_s$, from which $R_s=e_p/2i_s$. Since meter 48 reads the sum of currents $i_p+i_s$, and since $i_s$ remains constant throughout the $i_x$ range, the maximum error introduced by $i_s$ occurs when the smallest value of $i_p$ is measured. Taking this maximum error as 10%, $$i_s=0.1(.477\times10^{-6})=0.477\times10^{-7}$$

ampere. Finally, $$R_s=e_p/2i_s=(0.020)/(2)(.477\times10^{-7})=2\times10^{+5}\text{ ohms.}$$

TABLE III.—MULTI-RANGE $i_x$ DELIVERY DEVICE

| | Meter 53, mma. range | $i_x$, mma. range | $R_s$, ohms |
|---|---|---|---|
| Range No.: | | | |
| 1 | 10-100 | 5-50 | 200,000 |
| 2 | 100-1,000 | 50-500 | 20,000 |
| 3 | 1,000-10,000 | 500-5,000 | 2,000 |

The maximum voltage to be delivered by battery 51 through potentiometer 52 can be calculated according to Kirchoff's Loop Rule. From loop (L) shown in FIG. 5, maximum voltage $e_x$ delivered from potentiometer 52 is, $$e_x=2i_x(r_p'+R_l')+(i_x-i_p)(R_l/2+r_p)+(i_x+i_s)(R_s)$$

By taking electrode 49 in the form of a third duplicated electrode, it is a safe estimate to regard $r_p'=r_p$, and $R_l'=R_l$, since a larger anode, such as a container wall, would reduce the requirement for $e_x$. The above equation then simplifies to, $$e_x=i_x(R_s+3r_p+2.5R_l)+i_sR_s-i_p(R_l/2+r_p)$$

From inspection it is seen that the second and third terms are each equal to 0.01 volt and cancel out, leaving $e_x=i_x(R_s+3r_p+2.5R_l)$. At the top of Range 1, $i_x$=50 mma., and $R_s$ is about 100 times greater than $r_p$ or $R_l$, so a reasonable estimate is, $$e_x=i_xR_s=(50\times10^{-6})(2\times10^5)=10\text{ volts}$$

Smaller range span can reduce battery 51 voltage requirement, and the device of this invention is not limited to specific battery voltage selected for battery 51.

In precision corrosion current measurement, factors which tend to produce difference in performance between the measured duplicated electrodes should be minimized, and may require correction, as follows. The accelerated form of corrosion usually produces some difference between the free electrode potentials of the duplicated electrodes 41 and 42, but the extent of this difference is usually not significantly altered by application of total current $2i_x$. The duplicated resistors, $R_s$, should be equal within high precision, such as about ±0.1%. Slight difference between electrode 41 and 42 polarizabilities, as from area difference, can cause difference between the electrode potentials polarized by total current $2i_x$. Such difference between electrode potentials can be corrected for, through the series insertion into the corrosion current measurement circuit of an opposed voltage from a low ohmic resistance source.

Calculation of meter shunt resistors 55 and 56 of FIG. 6, for meter 53 of particular internal DC ohmic resistance, is known to the art.

The circuit isolation device of this invention is not limited to operation with values of isolation resistance $R_s$ of sufficient size to introduce negligible effect on the corrosion current measurement. Values of $R_s$ can be used which introduce definite positive error in the corrosion current measurement, and this error may not require correction for some purposes, while for other purposes, the error can be measured and corrected for by subtraction. There are many evident procedures for correcting for current $i_s$ in FIG. 6. If the ohmic value of $R_s$ is known, correction can be made through mathematical calculation. When duplicated electrodes 41 and 42 are both operated as measured electrodes, current $i_s$ is measured directly when the electrodes are disconnected and the same value of applied DC voltage is delivered across voltmeter 46. A procedure for measuring $i_s$ which is applicable when electrodes 41 and 42 are both measured as well as when one electrode is operated as a measured electrode and the other electrode is operated as a reference electrode, includes measuring the value of corrosion current with resistors $R_s$ connected to the electrodes when current $i_x$ is zero, measuring the value of corrosion current in the same manner but with resistors $R_s$ disconnected from the electrodes, and measuring $i_s$ as the difference between these two values of measured corrosion current. From this, it becomes evident that it is much easier to operate with values of $R_s$ large enough to introduce negligible positive error.

MEASUREMENT OF $i_B$ BY CIRCUIT ISOLATION ALTERNATIVE

The circuit isolation device described above enables measurement to be made, through the circuit isolation alternative, of the relationship between the cathodic polarizing current $i_x$ and corrosion current measurable during $i_x$ application, from which bounding current $i_B$ is measured as the minimum value of corrosion current in this relationship, and rate-determining corrosion current $i_R$ is approximately indicated as the value of $i_x$ at said minimum value of corrosion current. The corrosion current measurements are preferably made on a corrosion system including two duplicated electrodes, both of which may be operated as measured electrodes or one of which may be operated as the measured electrode with the other operated as a reference electrode, while current $i_x$ is passed to each of these electrodes through the circuit isolation device. Background for understanding details of actual method operation is provided by measurements illustrated through FIG. 1 to produce the general form of measurement shown in FIG. 7, as follows:

In using FIG. 1 to illustrate method operation, measurable current-potential relationship of the measured electrode is taken as the multi-linear relationship described above in terms of points 26 through 30. Method of corrosion current measurement according to my patents above, is substantially undisturbed by delivery of cathodic polarizing current $i_x$ through the circuit isolation device. A polarization voltage of 0.010 volt is selected for illustration, and the polarizing current producing this polarization is converted to the corrosion current through linear proportionality with $\frac{1}{2}E_d=0.0142$ volt.

The accelerated corrosion current $i_A$, is generally measured first to avoid the possibility of disturbing naturally occurring corrosion interface performance at potential $E_f$ by the passage of current $i_x$ during subsequent measurements, and because the value of $i_A$ determines the size of current units required for $i_x$. In FIG. 1, the point from which $i_A$ is measured is along line 26–27 at $E_f$=0.0335 volt and at $i_x$=zero. When measurement is made with a single measured electrode, a corrosion current $i_a$ can be measured from anodic polarization of $e_{pf}=-0.010$ volt and a corrosion current $i_c$, can be measured from cathodic polarization of $e_{pc}=+0.010$ volt, from which the average, $i_{av}$ is calculated. The measurable current producing anodic polarization of $e_{pa}=-0.010$ volt is located along line 27–26 at the potential, $E_f-e_{pa}=0.0335-0.010=0.0235$ volt and measured along the lower $i_x$ current axis is $i_{pa}=-143$ units, from which $i_a=(143)(.0142/.010)=203$ units. The measurable current producing cathodic polarization of $e_{pc}=+0.010$ volt is located along line 27–28 at the potential, $E_f+e_{pc}=0.0435$ volt and measured as $i_{pc}=117$ units, from which $i_c=166$ units. This illustrates the experimental observation stated above, that with accelerated corrosion, current $i_a$ is usually larger than current $i_c$. Current $i_A$ is measured with better precision from the averaged value, $i_A=i_{av}=(203+166)/2=185$ units. These measurements are summarized in Table IV below, in which $E_x$ is the electrode potential from which the polarization voltage is measured.

Figure 7:
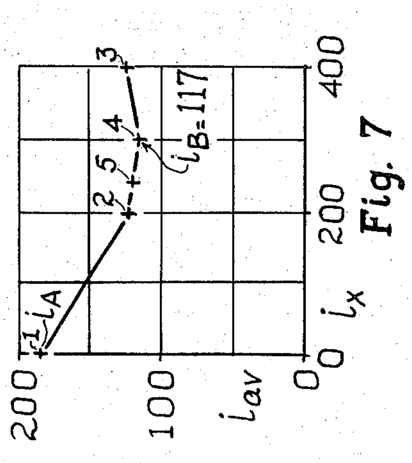
FIG. 7 shows form of measurement made through theoretical operation of this other method alternative for measurement of current $i_B$.

When measurement is made with duplicated measured electrodes, in effect a series polarizing current $i_p$ produces total measurable polarization voltage of $$e_p=(e_{pa}+e_{pc})=0.020$$

volt, in which $e_{pa}$ may be less than $e_{pc}$ in the presence of acceleration. In FIG. 1, the value of current $i_p$ operating in both anodic and cathodic directions from $E_f$ to produce total polarization voltage of 0.020 volt, neglecting solution IR loss which can be corrected for, must be measured through graphical trial and error. Such graphical measurement shows that when $i_p$=130 units, $e_{pa}$=0.0086 volt, $e_{pc}$=0.0121 volt, and their sum is 0.020 volt, from which $i_{av}$=185 units. These values are also included in Table IV which serves the additional purpose of illustrating the close agreement between $i_{av}$ values measured from a single measured electrode and from duplicated measured electrodes. In FIG. 7, current $i_A$ is shown at $i_{av}$=185, $i_x$=0.

Greatest accuracy in the measurement of bounding current $i_B$, of a corrosion system undergoing change produced only by time, is obtained through a series of $i_{av}$, $i_x$ measurements in which each value of $i_x$ is selected with the intention of determining through a minimum number of measurements, the minimum value of $i_{av}$ in the $i_{av}$, $i_x$ relationship, which minimum is taken as the measurement of bounding current $i_B$. While the method does not depend upon how and in what order such values of $i_x$ are selected and applied, an orderly selection saves time and causes a minimum of disturbance of the measured corrosion interface. By way of illustration of such an orderly selection, the first value of $i_x$ is taken as a convenient whole number approximating the measured value of current $i_A$. If the measured corrosion current $i_{av}$, is then equal to or greater than $i_A$, the second value of $i_x$ may be taken as half of the first value selected. Alternatively, if this measured corrosion current is then less than $i_A$, the second value of $i_x$ may be taken as twice the first value selected. The graphing of measurements, as illustrated in FIG. 7, aids in further selection of $i_x$ values.

In this illustration, the measurement of $i_A$=185 units suggests that the first value to which $i_x$ is adjusted can conveniently be 200 units. In FIG. 1, 200 units of $i_x$ polarizes the measured electrode along line 27–28 to the potential of $E_x$=0.0525 volt. Current $i_{av}$ is then measured from the 0.01 volt polarizations made in anodic and cathodic directions from $E_x$=0.0525 volt, as illustrated in detail above, and the value of $i_{av}$=124 units shown in Table IV is shown as point 2 in FIG. 7. In anticipation of continued decrease in measured corrosion current, $i_x$ is adjusted to a second value, such as 400 units, polarizing the measured electrode to $E_x$=0.0770 volt. Table IV sows that corrosion current is then measured as 125 units. This indicates that the minimum corrosion current occurs somewhere between the values of the second and third measurements, from which bounding current $i_B$ could be estimated without graphing if maximum measurement precision was not required, as might be the case with corrosion control operations. For the purpose of continuing this illustration into precision measurement, $i_x$ is adjusted to 300 units, which is between the second and third measurements. Table IV shows that a corrosion current of 117 units is then measured. FIG. 7 shows that this is not along the line defined from the first two measurements, and so is used to define a second line with the third measurement point. The intersection of these two lines indicates that minimum corrosion current would be measured at $i_x$=240 units. It is shown however, in Table IV, that when $i_x$=240, $i_{av}$=120 units. This fifth measurement point defines a line with the second and fourth measurement points, measuring $i_B$=117 units. This illustration made through FIG. 7 explains how actual measurements shown in FIGS. 8 and 9 were obtained, and adds evidence that the theory of method operation is confirmed through method operation.

TABLE IV.—ILLUSTRATION OF $i_B$ MEASUREMENT THEORY

| | $i_x$ per electrode | $E_x$ | Single electrode $i_a$ | $i_c$ | $i_{av}$ | Duplicated electrodes $e_a$ | $e_c$ | $e_a+e_c$ | $i_{av}$ |
|---|---|---|---|---|---|---|---|---|---|
| Measurement No.: | | | | | | | | | |
| 1 | 0 | .0335 | 203 | 166 | 185 | .0089 | .0121 | .0200 | 185 |
| 2 | 200 | .0525 | 128 | 119 | 124 | .0098 | .0102 | .0200 | 124 |
| 3 | 400 | .0770 | 111 | 138 | 125 | .0107 | .0093 | .0200 | 125 |
| 4 | 300 | .0648 | 118 | 115 | 117 | .0102 | .0100 | .0202 | 116 |
| 5 | 240 | .0570 | 123 | 116 | 120 | .0101 | .0100 | .0201 | 120 |

The value of $i_R$ as determined from the current-potential proportionalities of the Interface Electrode System is then, $i_R=2.4(i_A)-i_B=2.4(185)-117=327$ units, which checks closely with the showing in FIG. 1 of point 23 at 332 units. The value of $i_R$ as estimated from the value of $i_x$ at which $i_B$ is measured, is shown in FIG. 7 as, $i_R$=300, and has the significance of confirming, through actual measurements reported in the examples below, that the form in which relation relationship $E_{fc}$–$C_c$ is drawn in FIG. 1 does explain the performance of actual corrosion systems.

In actual method operation, when a value of DC voltage $e_v$, is applied between the anode electrode and the two duplicated electrodes of the corrosion current measurement system through the circuit isolation device, the current-potential relationship of $i_x$ and $e_v$ change rapidly at first, and then changes more slowly as an equilibrium value is approached. Additional method details pertaining to this change of current-potential relationship with time are as follows.

By way of precedent, in the precision measurement of corrosion current according to my above patents, measurement is taken when the $i_p$, $e_p$ relationship has approached equilibrium to the extent that no measurable change occurs during a short time interval, such as 20 seconds. In this measurement of corrosion current, the polarization voltage $e_p$ is generally of the order of only 0.01 to 0.02 volt, so that measurement can generally be made within less than two minutes after initiation of the polarizing current $i_p$. However, FIG. 1 illustrates that the polarization voltage range required from the series of selected values of $i_x$ extends from $E_f$ to some value greater than $E_{fa}$, the span of which increases with increase of acceleration intensity. The maximum value of $i_x$=400 in FIG. 7 represents a polarization voltage span in FIG. 1 of 0.0770−0.0335=.0435 volt, while the actual measurements in FIG. 3 shows a span of about 0.14 volt was required to determine bounding current $i_B$. Because of this larger range of polarization voltage in the use of current $i_x$, a much greater time would be required for the $i_x$, $e_v$ relationship to closely approach equilibrium, and an excessive total time would be required for $i_B$ measurement. Also, extended durations of current $i_x$ may tend to alter corrosion interface composition and performance. Thus, measurement with an electrode system including a measured electrode, and a reference electrode not polarized with current $i_x$ is impractical, because measurement of corrosion current cannot be made until the $e_v$, $i_x$ relationship has also closely approached equilibrium. This problem is overcome through the use of duplicated electrodes which undergo substantially equal rate of polarization by current $i_x$, so that the $i_p$, $e_p$ values for corrosion current measurement can be taken while current $i_x$ is still producing small rate of increased polarization on the duplicated electrodes.

Details considered above indicate that precision of bounding current measurement is determined from a plurality of factors related to time, some of which are opposed in affect to others. Precision in corrosion current measurement requires taking the measurements after the measured current-potential relationship undergoes small rate of change. The possible advantages gained by allowing the $e_v$, $i_x$ relationship to closely approach equilibrium becomes lost by the disturbance of current $i_x$ on naturally occurring interface performance, such as through increased pH and reducing action. The increased time required for measuring $i_B$ from a plurality of consecutive measurements, each made with sufficient time to produce precision, has little significance if the actual corrosion system being measured is undergoing significant rate of change in such factors as ionic conductor composition, or corrosive environment such as temperature, flow rate, and amount of aeration. This invention therefore inclues the concept of optimizing measurement-time factors according to the requirements of the corrosion system being measured. The range of possible variation in method operation for such optimization extends from $i_B$ measurement through a series of point measurements, as illustrated above, to $i_B$ measurement through continuous delivery of increasing value of current $i_x$ during which corrosion current is continuously measured. More detailed description is included in the examples which follow.

EXAMPLE 2

Measurement of $i_{av}$, $i_x$ relationship

The corrosion system measured by this method alternative was that already described in Example 1. The duplicated electrodes used in making the measurements were electrodes #2 and #3. The anode from which $i_x$ was passed was that described in Example 1 with regard to form and positioning within the corrosive. The instants of time selected for making the measurements of $i_A$ and $i_B$ were scattered between the two method alternatives of these examples, to thereby obtain close comparison between them.

Most of the data of this example was obtained through the following steps, exemplifying optimization in the form of good precision in $i_{av}$ measurement with a minimization of time required for the $e_v$,$i_x$ relationship to approach small rate of change, and with reasonable minimization of the tendency of the $i_x$-time factor to disturb corrosion interface performance. In making the measurement of $i_{av}$ and $i_x$, current $i_x$ was applied at a selected value and held by adjustment for one minute. The corrosion current $i_{av}$ was then measured, and during the time of waiting for close approach of the current-potential relationship toward equilibrium in this measurement, further adjustments were made to hold $i_x$ at the selected value. Upon completion of $i_{av}$ measurement, current $i_x$ was removed and the corrosion interface was allowed to return toward its undisturbed condition for one minute before application of the next selected value of $i_x$.

In measuring $i_{av}$ from a single measured electrode, a first measurement is the potential of the measured electrode as measured from the reference electrode, from which the 0.010 volt of polarization is then measured in obtaining the corrosion current. The difficulty encountered in attempting such measurement with an unpolarized reference electrode is summarized in Table V below. With a saturated calomel reference electrode, the time required for stabilization of the $e_v i_x$ relationship apparently increases exponentially. When $i_x$ is 300 mma., 14 minutes was required to measure potential $E_x$ of electrode #2 polarized by $i_x$. The measurement of $i_B$, shown below to occur at $i_x$=400 mma., would clearly require an excessive time.

TABLE V.—MEASUREMENT OF $E_x$ FROM CALOMEL ELECTRODE

| $i_x$, mma. | Minutes | $E_x$, volts |
|---|---|---|
| 0 | 2 | 0.632 |
| 100 | 3 | 0.640 |
| 200 | 5 | 0.656 |
| 300 | 14 | 0.720 |

The measurement of $i_B$ at about 183 hours with the reference electrode in the form of a duplicated electrode, #3, also polarized by cathodic current $i_x$, is shown in Table VI below, and in FIG. 8. The opposed electrode was another duplicated electrode introduced into the solution only during this form of measurement, and positioned to place measured electrode #2 between it and reference electrode #3. The total time of 66 minutes for six measurements is still excessive. The $E_x$ values are not very significant, because polarization of duplicated electrodes by current $i_x$ remains equal only within the precisions of electrode duplication and duplication in intensity of the accelerated corrosion. The measurements were made with 0.010 volt anodic and cathodic polarizations.

TABLE VI.—$i_B$ FROM MEASURED AND REFERENCE DUPLICATED ELECTRODES

| | $2i_x$ | $E_x$ | $i_a$ | $i_c$ | $i_{av}$ | Minutes |
|---|---|---|---|---|---|---|
| Measurement No.: | | | | | | |
| 1 | 0 | .000 | 162 | 131 | 147 | 8 |
| 2 | 200 | .004 | 123 | 105 | 114 | 9 |
| 3 | 400 | .008 | 78 | 60 | 69 | 14 |
| 4 | 600 | .012 | 57 | 33 | 45 | 10 |
| 5 | 800 | .016 | 45 | 37 | 41 | 12 |
| 6 | 1,000 | .028 | 60 | 72 | 66 | 13 |
| Total | | | | | | 66 |

Measurements of $i_A$ made with duplicated measured electrodes #2 and #3 at applied DC voltages of 0.011 and 0.022 volt were in close agreement with $i_A$ measurements made on electrode #2 at 0.010 volt polarizations as measured from #3 electrode operated as the reference electrode. This was taken as an indication that the 0.001 volt added for solution IR loss correction per 0.010 volt of total polarization of the duplicated measured electrodes, was correct. The measured points of $i_A$-time relationship clearly shown in FIG. 11, were obtained from the duplicated electrodes with the applied DC voltage of 0.011 volt, which voltage was also used in measuring $i_{av}$,$i_x$ relationship in $i_B$ measurement. Measured polarizing current was transformed to corrosion current through linear proportionality with $E_d$=0.0284 volt.

The measurement of $i_B$ values made with duplicated measured electrodes #2 and #3 is illustrated through Table VII. The device used in making the measurements holds applied DC voltage constant and measures approach to equilibrium from small change in polarizing current. It also includes a series source of variable DC voltage of low internal resistance and reversible polarity, as described in my U.S. Pat. No. 3,069,332, to equalize difference in $E_f$ and $E_x$ potentials occurring between the duplicated electrodes. Table VII shows these voltage differences ranging from +.003 to −.004 volt, so that their elimination was convenient with the total polarization voltage of current measurement made at 0.011 volt. Each measurement of $i_{av}$, and of $i_{av}'$ obtained by reversal of the applied DC voltage, and of $2i_x$, required about five minutes, and $i_B$ value was generally determined within five to seven of such measurements, so that this method for $i_B$ measurement required a time lapse of 25 to 35 minutes. The current measurements of Table VII are shown graphed in FIG. 9. The averaged values, $i_{AV}$, fall in close linear relationship to determine $i_B$=52 mma., at $2i_x$=740 microamperes. The $i_{av}$ currents are consistently larger, and measure $i_B$ as about 77 mma., while the $i_{av}'$ currents are consistently smaller and measure $i_B$=25 microamperes. Other measurements have demonstrated that the first measured current, $i_{av}$, is not always larger, and the difference is attributed to mainly difference in intensity of acceleration occurring on the electrodes. Other values of $i_B$ were similarly measured, and are clearly shown in FIG. 11.

TABLE VII.—$i_B$ FROM DUPLICATED MEASURED ELECTRODES

| | $2i_x$ | $E_f$ and $E_x$ voltage difference | $i_{av}$ | $i_{av}'$ | $i_{AV}$ | Minutes |
|---|---|---|---|---|---|---|
| Measurement No.: | | | | | | |
| 1 | 0 | +.003 | 180 | 182 | 181 | 4 |
| 2 | 200 | +.002 | 150 | 136 | 143 | 5 |
| 3 | 400 | +.001 | 136 | 100 | 118 | 7 |
| 4 | 600 | −.001 | 90 | 58 | 74 | 5 |
| 5 | 800 | −.002 | 84 | 26 | 55 | 5 |
| 6 | 1,000 | −.003 | 88 | 56 | 72 | 5 |
| 7 | 900 | −.004 | 80 | 45 | 63 | 5 |
| Total | | | | | | 33 |

In FIG. 11, each value of rate-determining corrosion current $i_R$ was calculated through the current-potential proportionalities of the Interface Electrode System as, $i_R=2.4(i_A)-i_B$, from values of $i_A$ and $i_B$ averaged over each time interval selected in integrating the $i_R$-time relationship to mg.-time relationship. The $i_R$ values in FIG. 11 were located in the center of each time interval, and the mg. values were located at the end of each time interval. Metal loss was calculated directly from $i_R$ value applied to Faraday's law, according to the anodic reaction, $Fe=Fe^{2+}+2(-)$, as was illustrated above. As stated above, the rapid initial decrease of corrosion current is attributed to breakdown of initial oxide film. The minimum value of accelerated corrosion current, $i_A$=122 mma. at 63 hours, is far above $i_B$=61 mma., thus illustrating that minimum $i_A$ value does not define $i_R$ value when acceleration is increased beyond a small intensity. At 196 hours, the mg.-time relationship of FIG. 11 indicated a metal loss of 54.9 mg., at which time the #1 electrode which had not been used in electrochemical measurement, was removed and metal loss was weighed as 63.5 milligrams. These two measurement methods define an average metal loss of (54.9+63.5)/2=59.2 mg. ±7%, which is regarded to be within the precisions of the two methods. Final 304 hour metal loss of 90.9 mg. was indicated by the mg.-time relationship. The weighed metal losses were 87.0 mg. on electrode #2, and 73.0 mg. on electrode #3, averaging 80.0±8.8%. The two methods define an average of (90.9+80.0)/2=85.5 mg. ±6%, again regarded to be within the precisions of the two methods. Intensity of corrosion, expressed as $i_R/i_B$, was at a minimum of 234/58=4.0 at 83 hours, and increased to 345/55=6.3 at 304 hours, and was still increasing. These values average the performances of electrodes #2 and #3.

It was shown above that in general the cathodic polarizing current $i_x$, applied to produce the bounding current $i_B$, is an approximate indication of rate-determining corrosion current $i_R$. The values of $i_R=i_x$ measured in this manner from the $i_B$ measurements in FIG. 11, are shown in Table VIII below. Plotting of this $i_R$-time relationship shows data point scattering of the order of ±16%. The quantity-time relationship calculated therefrom indicates final weight loss at 304 hours as 103 mg., compared to the 80.0 mg. weighed average of measured electrodes #2 and #3, showing about +28% error.

TABLE VIII.—SIMPLIFIED $i_R$ MEASUREMENT, DUPLICATED ELECTRODES

| | Hours | $i_R$ value of $i_x$, mma. |
|---|---|---|
| Measurement No.: | | |
| 5 | 14.5 | 350 |
| 8 | 47.5 | 250 |
| 10 | 99.8 | 260 |
| 12 | 146 | 350 |
| 14 | 198 | 400 |
| 17 | 288 | 350 |

The time requirement for $i_B$ measurement by the method used in FIGS. 9 and 11, averaging about 30 minutes, may not be objectionable in research and development work where corrosive composition and corrosive environment are under control and generally held constant over substantial time intervals, but it is regarded as too elaborate and time consuming for corrosion control in industry. Much faster measurement, without significant loss of precision, is made by delivering current $2i_x$ through the circuit isolation device to duplicated electrodes at a selected rate of increase, while continuously measuring the corrosion current. The corrosion current is measured by the polarizing current required to produce a selected value of polarization voltage, according to my patents above, which is held constant through delivery of the required range of current $2i_x$. The duplicated electrodes can be operated alternatively as two measured electrodes, or as one measured electrode and one reference electrode. The circuit isolation device is adjusted to deliver $2i_x$ in range from about zero to an upper value estimated in terms of $i_A$ through the relationship, $i_R=2.4(i_A)-i_B$, as follows. As stated above, acceleration seldom exceeds the ratio, $i_A/i_B=3.5$, from which $i_B=i_A/3.5$; as demonstrated above, the value of $i_x$ polarizing to the $i_B$ value is approximately, $i_x=i_R$; substituting, $i_x=i_R=2.4(i_A)-i_A/3.5=2.1i_A$. However, $i_x$ must be applied beyond the value producing $i_B$, to show $i_B$ as the minimum value, for which purpose maximum $i_x$ value is increased to about $3i_A$; then $2i_x=6i_A$ estimates the upper range value.

For example, in a duplication of the corrosion cell of Examples 1 and 2, precision measurement by the method of FIG. 9 produced the values, $i_A$=206 mma., and $i_B$=75 mma. at $2i_x$=1,000 microamperes, referred to below for purposes of comparison. Two hours later, the most simplified measurement of $i_B$ was made as follows. Using 0.011 volt applied to duplicated electrodes #2′ and 3′, accelerated corrosion current was measured as, $i_A=(195+184)/2=189$ microamperes. The circuit isolation device was adjusted for delivering $2i_x$ within the approximate range of $6i_A$=1,200 microamperes. The corrosion current measurement device was adjusted to equalize a 0.002 volt difference between the free electrode potentials of the duplicated electrodes. The DC voltage of 0.011 volt was applied to the electrodes, and was held constant throughout the subsequent application of the $2i_x$ range. When the rate-indicating polarizing current changed only slightly over a 15 second time interval, current $2i_x$ was delivered at a uniform rate of increase to cover the above estimated range within about 5 minutes, during which time the rate-indicating current was continually observed. As soon as the rate-indicating current no longer decreased and as soon as a slight increase could be observed, current $2i_x$ was held constant, and was at 1,200 microamperes. The value of rate-determining current was taken and measured $i_{B1}=50$ microamperes. The polarity of the 0.011 volt delivered to the duplicated electrodes was reversed, and the second corrosion current was measured as $i_{B2}=122$ mma., from which the average of $i_B=86$ mma. was obtained. If the $E_x$ potentials of the duplicated electrodes at this time was separated by a voltage difference causing inconvenience or diminished accuracy in corrosion current measurement, they could have been equalized by adjustment of the measurement device. Measurement of $i_B$ was accomplished over a time interval of about 9 minutes, and the measured value differed from the above reference value by $(86-75)/75=+15\%$. Current $i_R$, as measured through the above reference value of $i_B=75$ mma., is $i_R=(2.4)(189)-75=379$ mma., while as measured through $i_B=86$ mma., of the simplified measurement, $i_R=2.4(189)-86=368$ mma., indicating that difference from reference $i_B$ value amounts to only $(368-379)/379=-3\%$ difference in $i_R$ value.

By way of further example, the above method can be carried out automatically with an X–Y recorder, as shown in FIG. 10. The recording was started with the application of $2i_x$ applied at the selected rate of increase, and was stopped beyond determination of $i_B$ value, as shown by the solid parallel lines bounding the recorded fluctuation. The recording measures $i_A=195$ mma., $i_{B1}=60$ mma., $2i_x=1,090$ mma., within a time interval of about five minutes. The DC voltage of 0.011 volt applied to the electrodes was reversed in polarity and a second recording was made as shown by the parallel dash bounding lines, which measure $i_A=180$, $i_{B2}=82$, $2i_x=1020$. The averaged values of $i_A=188$ mma., $i_B=71$ mma., indicate such good agreement with the reference values above, that the recording time can be reduced further if required by very rapid changes occurring to ionic conductor composition or corrosive environment. Also since $2i_x$ is increased at a substantially constant selected rate of change, equivalent abscissa recording movement can be produced by the time axis of a corrosion current recorder for the purpose of $i_B$ measurement.

FURTHER EXAMPLES OF METAL LOSS CORRELATION

Additional examples of the method of this invention are directed to demonstrating its operation within appreciable ranges of variation in composition of electronic conductor and non-gaseous ionic conductor, through correlation with weight loss measurement, as summarized in Table IX below. Measurements were made through the extended range alternative and through the circuit isolation alternative on each of these corrosion systems, and further confirmed the substantial equivalency of their operation. The correlations with weight loss measurement were made for the purpose of proving method operation, and do not necessarily indicate method operation at maximum measurement precision.

The corrosion systems are classified into four performance groups, with a discussion of each group following after Table IX. It should be kept in mind that the purpose of the measurement method is to supply information for research, development, and control purposes in the development and use of alloys and corrosion inhibitors, and in the adjustment and control of corrosive composition and environment in process industries. The ability of the method to classify corrosion performance into different groups is an asset added to the finding of "ideal" performance in Group 1.

In all of the corrosion systems in Table IX, the corrosive was exposed to the atmosphere at room temperature and flowed by 120 r.p.m. rotation of the 2 x 6 cm. stirrer positioned at the bottom of the container, through which a reasonably fixed intensity of oxygen acceleration was employed for comparative purposes. The chemicals used were pure, and were dissolved in distilled water to form solutions of composition and volume stated in Table IX. With 900 cc. volumes, the container was in the form of a one liter beaker. Positioning of the various electrodes followed the details of the examples above. With electrodes made from sheet stock, the sheet surfaces were positioned parallel to the lines of solution flow. All electrode surfaces were polished through #280 grit size, to remove surface imperfections. The electrodes were totally immersed in vertical and parallel position. Duplicated electrodes were included in each corrosion system. Upon removal at the end of the corrosion, corrosion products were removed by brushing during rinsing.

TABLE IX.—DIVERSIFIED EXAMPLES OF METHOD OPERATION

| Metal | Electrodes, cm. | Corrosive composition percent total volume | Corrosion, hours | Valence | Milligram of— From $i_R$ | Milligram of— Weight loss |
|---|---|---|---|---|---|---|
| Group 1: | | | | | | |
| Aluminum, pure | Rod, 0.4 x 3 | 4 g. oxalic acid, 1 g. sodium chloride, 900 cc | 67 | 3 | 41.3 | 44.0 |
| Steel, 1018 | Rod, 0.4 x 3 | 25 g. sodium chloride, 2,500 cc | 54 | 2 | 18.7 | 19.0 |
| | | 100 p.p.m. chromate | 190 | 2 | 33.2 | 30.0 |
| | | HCl to pH 3 | 194 | 2 | 36.3 | 33.2 |
| Cadmium, pure | Rod, 0.4 x 3 | 1 cc. acetic acid, 3 g. sodium chloride, 900 cc | 100 | 2 | 353. | 332 |
| Nickel, pure | Sheet, 0.5 x 3 | 4 g. citric acid; 1 g. sodium chloride, 900 cc | 178 | 2 | 22.0 | 24.3 |
| Lead, pure | Sheet, 0.5 x 3 | 2 g. citric acid; 1 g. sodium chloride, 900 cc | 95 | 2 | 327.0 | 299 |
| Group 2: | | | | | | |
| Zinc, pure | Sheet, 0.5 x 3 | 9 g. sodium chloride, 900 cc | 201 | 4 | 18.1 | 20.0 |
| | | From $i_A$ | | 2 | 21.9 | |
| Copper, roofing | Sheet, 0.5 x 3 | 4 g. citric acid; 0.1 g. sodium chloride, 900 cc | 115 | 4 | 5.7 | 6.1 |
| | | From $i_A$ | | 2 | 6.2 | |
| Group 3, nickel, pure | Sheet, 0.5 x 3 | 6 g. citric acid, 900 cc | 110 | 1.0 | 7.2 | 7.0 |
| Group 4, aluminum, pure. | Rod, 0.4 x 3 | 5 g. oxalic acid, 900 cc | 199 | 0.5 | 8.3 | 8.5 |

In Group 1, where anodic valence equals corrosion product valence, the measurements made on 1018 steel in sodium chloride are of particular interest because they illustrate accurate following of changed corrosive composition. During the first 54 hours of corrosion in sodium chloride solution. $i_A$ dropped from an initial 350 mma. to approach a constant rate at 150 mma., during which most of the electrode surface became covered with rust. Current $i_B$, around 50 mma., did not change much. The addition of 100 p.p.m. of chromate, ($CrO_4^{--}$), made at 54 hours, produced a sharp peak of $i_A=220$ mma., which dropped to 135 mma. four hours later, and $i_B$ remained substantially unchanged. At 190 hours, $i_A$ was approaching $i_B$, which had decreased regularly to 23 microamperes. During the last four hours, the effect of hydrochloric acid additions made to lower the pH 1 pH unit at a time, to pH 3, was to produce substantially linear increase of $i_A$ to 470 microamperes.

In Group 2, where $i_A$ and $i_B$ measurement correlated with weight loss measurement when the anodic valence was taken as twice the corrosion product valence, close agreement in $i_B$ measurement was obtained with both alternatives of the method of this invention. The indication of an anodic valence of four, would be understandable if half of the anodically dissolved metal is redeposited in the cathodic reaction. The finding that the $i_A$-time relationship operating through a valence of two, also correlated with weight loss measurement, would then be changed in significance to only that of coincidence.

The finding in Group 3, of accurate quantity measurement at a whole number valence that is less than the corrosion product valence, was mentioned above as indicating initiation of the corrosion by rate-determining electrochemical reaction, followed by chemical reaction.

Group 4 is distinguished by the findng that measured corrosion current $i_{av}$, increases with increase of externally applied cathodic polarizing current $i_x$, indicating that the oxygen dissolved in the ionic conductor, and its flow rate, were not producing an accelerated corrosion mechanism. This indication was confirmed through measurement of current-potential range with a reference electrode, which showed the steepest line of slope to occur through the free electrode potential $E_f$. Evidently the passivating film shields against acceleration. In agreement with this view is the finding that the chromate inhibition of iron causes $i_A$ to decrease to the value of $i_B$, which in turn decreases. Such measurements are of value in the development and control of passive alloys and passivating inhibitors.

A further grouping of corrosion interface performance is not indicated in Table IX, but should be mentioned. Without the addition of sodium chloride, and in the presence of the highly accelerating action of dissolved oxygen and substantial flow rate, a wide range of metals are attacked by inorganic and strong organic acids at unusually high rates, equivalent to several thousand microamperes per five square centimeter area. This very high rate is above that encountered in most pickling operations, and is far beyond that of interest to the corrosion engineer, but the performance adds to an understanding of the acceleration mechanism of FIG. 1. With systems undergoing this high rate of corrosion acceleration, corrosion current $i_{av}$ remains substantially constant over a a large range of $i_x$. The explanation for such performance is regarded to pertain to change in form of relationship $E_{fc}$–$C_c$ of FIG. 1. As shown in FIG. 1, the slope of this relationship is just starting to decrease rapidly as the curve leaves the top of the graph. If this range of rapidly decreasing slope and polarizability was decreased in potential so that it occurred around the free electrode potential $E_f$, measurable cathodic current-potential relationship would approach in shape a single straight line of small slope. Such a condition evidently occurs in the absence of the alkaline cathodic film formed by the presence of metal ions, particularly those of sodium ions which are usually present in corrosives of practical interest.

With regard to the devised expression, $i_R=i_A^2/i_B$, illustrated earlier above, it is of interest to note that up to about $i_A/i_B=2/1$, $i_A^2/i_B=(2)^2/1=4$, and is in fair agreement with $i_R=2.4(i_A)-i_B=2.4(2)-1=3.8$, but at increased acceleration intensities above this ratio, $$i_R=i_A^2/i_B$$

produces exponentially increasing positive error.

ELECTRODES

FIG. 12 shows in substantially actual size, an end view and a side view of a three electrode proble particularly adapted for operation through the method of this invention. The end view is along the major axes of the electrodes. Duplicated measured electrodes 41 and 42 are symmetrically positioned equidistant from the anode electrode 49, and the electrodes are mounted in an insulating material, 57, selected to resist the actions of corrosive, temperature, and pressure of the specific corrosion system to be measured. The electrodes are made of the metal or alloy required to form the corrosion interface to be measured. A specific embodiment of insulator 57 is a cast epoxy resin. As shown in FIG. 12, anode 49 may be made of a slightly larger diameter. Exposed electrode length is not very critical, and is adjusted to suit the particular application. Electrode length of 3 cm. is shown. It is known to the art that such an electrode assembly can be mounted in resistant metal hardware of standard thread sizes, to facilitate positioning of the probe in pipes and tanks.

For corrosion control purposes, where precision of measurement may become of less importance, the probe with two duplicated electrodes may be used, and the metal container wall surrounding the probe is then operated as the anode. The large surface area of a container wall such as a pipe or tank, greatly diminishes the anodic current density, and the time required for making $i_B$ measurements is generally a negligible fraction of total time of container wall exposure to the corrosive, so that no practical objection results.

The method of this invention can be very advantageously applied to cathodic protection engineering. By way of illustration, through the extended range method alternative initiation of cathodic protection can be engineered as follows. A measurable electrode of the same composition as the structure to be protected, is positioned near the structure. Through the addition of an opposed electrode and a reference electrode, measurement of the relationship of points 26 through 30 of FIG. 1 produces measurement of potential $E_{fa}$, which defines the cathodic potential to which the cathodic protection current should polarize to protect against the pitting produced by the accelerated corrosion. If even more protection is contemplated, the *a–a'* current-potential relationship provides the basis for calculating the current-potential requirement. The measurable electrode is then electrically connected to the structure, and the protecting current density is adjusted to produce the selected cathodic protection potential, $E_{CP}$, as measured between the measured and reference electrodes. After cathodic protection is applied, its operation can be controlled as follows. At any selected time, the potential of the measurable electrode, $E_{CP}'$, which should receive substantially the same cathodic protection current density as the protected structure, is measured from the reference electrode. The measured electrode is then disconnected from the structure, and immediately thereafter measurement is made of its cathodic current-potential relationship range, to include potential $E_{CP}'$ and $E_{fa}'$. The potential of $E_{CP}'$ with reference to potential $E_{fa}'$ measures operation of the cathodic protection for control purposes. In actual practice a plurality of measurable electrodes strategically positioned along the surface of the structure to be protected, can be used. A "standard" reference electrode is not required. The reference and opposed electrodes can be left undisturbed with the measured electrode during operation of the corrosion.

Underground structures are known to undergo "stray-current" electrolysis, produced by DC current passing anodically from the structure to another underground metal surface operating as a cathode. Heretofore, the detection and measurement of the extent of such electrolysis has been limited to uncertain techniques. It is apparent from the details described above, that the method of this invention can be applied to the detection and detailed measurement of "stray-current" electrolysis.

I claim:

1. The method of measuring the rate-determining corrosion current $i_R$ of an electrode positioned in the nongaseous ionic conductor of a corrosion cell, including the steps of detecting the presence of measurable corrosion acceleration of said electrode by measuring the corrosion current occurring at the free electrode potential $E_f$ from the resultant current/voltage ratio of DC polarizing current and resulting polarization voltage as measured at a value selected within a small voltage range producing proportionality of said D.C. polarizing current and said corrosion current, and by then passing to said electrode an increment of cathodic polarizing DC current $i_x$ by a means not interfering with corrosion current measurement while measuring the corrosion current occurring at the polarized electrode potential produced by said current $i_x$, and when said cathodic polarizing current $i_x$ produces decrease in measurable corrosion current, then varying the said cathodic polarizing current $i_x$ and measuring the relationship between said current $i_x$ and the corrosion current produced by the current $i_x$ through a range extending at least to the minimum corrosion current measurable, and determining the rate-determining corrosion current $i_R$ through the relationship between said minimum corrosion current and the initial corrosion current measured, whereby said rate-determining corrosion current $i_R$ measures rate of metal loss through Faraday's Law of Electrolysis.

2. The method of claim 1 in which measurement is made of the value of cathodic DC polarizing current $i_x$ that polarizes the electrode to the potential at which the minimum corrosion current is measured, whereby the rate-determining corrosion current $i_R$ is estimated as approximately equal to said measured value of current $i_x$.

3. The method of claim 1, in which the range of relationship between cathodic DC polarizing current $i_x$ and the corrosion current is measured with a system including said measured electrode, a reference electrode and an opposed electrode, and includes measurement of the relationship between cathodic polarizing current $i_x$ and the resulting polarization voltage, with said current ranging from substantially zero to at least the value of current producing a minimum current/voltage ratio, in which measurement of the accelerated corrosion current $i_A$ occurring at the free electrode potential $E_f$ and of a bounding current $i_B$ defined as the minimum corrosion current in the current $i_x$ range relationship, are transformed from resultant current/voltage ratio values into units of current applicable to Faraday's Law of Electrolysis through direct proportionalities, and in which the rate-determining corrosion current $i_R$ is measured through corrosion mechanism relationship, as equal to or substantially equivalent to, $i_R=2.4(i_A)-i_B$.

4. The method of claim 1, in which said range of relationship between cathodic DC polarizing current $i_x$ and the corrosion current is measured with a measuring circuit including said measured electrode, a duplicate of said measured electrode, and an anode electrode connected to said duplicated electrodes through two duplicated series resistors of ohmic value selected to substantially isolate the corrosion current measuring circuit from a circuit passing current $i_x$ to each of said duplicated electrodes, in which measurement of the accelerated corrosion current $i_A$ occurring at the free electrode potential $E_f$ and of a bounding current $i_B$ defined as the minimum corrosion current in the current $i_x$ range are transformed from resultant current/voltage ratio values into units of current applicable to Faraday's Law of Electrolysis through direct proportionalities, and in which the rate-determining corrosion current $i_R$ is measured through corrosion mechanism relationship as equal to or substantially equivalent to, $i_R=2.4(i_A)-i_B$.

5. The method of claim 1, in which said range of relationship between cathodically polarizing current $i_x$ and the corrosion current is measured with a measuring circuit including said measured electrode and a reference electrode in the form of a duplicate of said measured electrode, said measuring circuit also including, an opposed electrode, and an anode electrode connected to said duplicated electrodes through two duplicated series resistors of ohmic value substantially isolating the corrosion current measuring circuit from a circuit passing current $i_x$ to each of said duplicated electrodes, in which measurement of the accelerated corrosion current $i_A$ occurring at the free electrode potential $E_f$ and of a bounding current $i_B$ defined as the minimum corrosion current in the current $i_x$ range are transformed from resultant current/voltage ratio values into units of current applicable to Faraday's Law of Electrolysis through direct proportionalities, and in which the rate-determining corrosion current $i_R$ is measured through corrosion mechanism relationship, as equal to or substantially equivalent to, $i_R=2.4(i_A)-i_B$.

6. The method of claim 1 wherein said voltage range is from slightly above zero up to about 0.03 volt.

7. The method of claim 1, in which a range of cathodic polarizing current $i_x$ is produced through a series of changes made in the value of $i_x$, with a corrosion current measurement made at each $i_x$ value.

8. The method of claim 1, in which a range of cathodic polarizing current $i_x$ is produced by applying current $i_x$ at a selected rate of continuous increase, during which the corrosion current is continuously measured, whereby the minimum corrosion current $i_B$ is measured within a minimum time lapse.

References Cited

UNITED STATES PATENTS

| | | | |
|---|---|---|---|
| 3,069,332 | 12/1962 | Seyl | 204—1 T |
| 3,156,631 | 11/1964 | Seyl | 204—195 |
| 3,250,689 | 5/1966 | Seyl | 204—195 |
| 3,406,101 | 10/1968 | Kilpatrick | 204—195 |

TA-HSUNG TUNG, Primary Examiner

U.S. Cl. X.R.

204—195 C